US012762035B2

(12) United States Patent
Jain et al.

(10) Patent No.: US 12,762,035 B2
(45) Date of Patent: Oct. 13, 2026

(54) SYNTHETIC DATA GENERATION UTILIZING GENERATIVE ARTIFICIAL INTELLIGENCE AND SCALABLE DATA GENERATION TOOLS

(71) Applicant: Microsoft Technology Licensing, LLC, Redmond, WA (US)

(72) Inventors: Richin Jain, San Ramon, CA (US); Juliana Shihadeh, Morgan Hill, CA (US); Ramasubramanian Ramani, Redmond, WA (US); Keshava Sastry Pokkuluri, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 391 days.

(21) Appl. No.: 18/417,954

(22) Filed: Jan. 19, 2024

(65) Prior Publication Data

US 2025/0238340 A1 Jul. 24, 2025

(51) Int. Cl.
*G06F 11/34* (2006.01)
*G06F 40/35* (2020.01)

(52) U.S. Cl.
CPC .......... *G06F 11/3428* (2013.01); *G06F 40/35* (2020.01)

(58) Field of Classification Search
None
See application file for complete search history.

(56) References Cited

U.S. PATENT DOCUMENTS

| | | | | |
|---|---|---|---|---|
| 11,704,169 | B2 | 7/2023 | Truong | |
| 11,978,273 | B1 * | 5/2024 | Ramaswamy | G06V 30/412 |
| 2006/0230317 | A1 | 10/2006 | Anderson | |
| 2025/0156955 | A1 * | 5/2025 | Ramaswamy | G06Q 40/08 |
| 2026/0064743 | A1 * | 3/2026 | Dai | G06F 16/3344 |

OTHER PUBLICATIONS

Chen, et al., "A Unified Framework for Generative Data Augmentation: A Comprehensive Survey", arXiv:2310.00277v1, Sep. 30, 2023, 85 Pages.
Extended European search report received in European Application No. 25150452.8, mailed on May 23, 2025, 12 pages.

(Continued)

*Primary Examiner* — Raymond L Nimox

(57) ABSTRACT

Systems, methods, devices, and computer readable storage media described herein provide techniques for generating synthetic data utilizing generative artificial intelligence (AI) models and scalable data generation tools (SDGTs). A prompt comprising a domain is provided to an AI model. A parameter associated with the domain that specifies a boundary for synthetic values in a column of data is received from the AI model. An argument comprising the parameter is provided to an SDGT to generate scaled data based on the parameter. The scaled data comprises a column of synthetic values wherein each synthetic value is within the boundary specified by the parameter. In an aspect, an emulated workload is caused to utilize synthetic data comprising the scaled data to generate a performance benchmark. In a further aspect, a lightweight model is trained to generate synthetic sentences based on training data generated by the generative AI model based on the prompt.

20 Claims, 21 Drawing Sheets

(56) References Cited

OTHER PUBLICATIONS

Yu, et al., "Interactive Data Synthesis for Systematic Vision Adaptation via LLMs-AIGCs Collaboration", arXiv:2305.12799v1, May 22, 2023, 11 pages.
"Learn Data Engineering with Python", Packt Publishing, retrieved from: https://github.com/PacktPublishing/Data-Engineering-with-Python/.
Azaria, et al., "The Internal State of an LLM Knows When It's Lying", arXiv:2304.13734, Oct. 17, 2023, 10 pages.
Hamalainen, et al., "Evaluating Large Language Models in Generating Synthetic HCI Research Data: A Case Study", Proceedings of the 2023 CHI Conference on Human Factors in Computing Systems, Apr. 2023, pp. 1-19.
Hernandez, et al., "Synthetic data generation for tabular health records: A systematic review", Neurocomputing, vol. 493, Jul. 7, 2022, pp. 28-45.
Hollmann, et al., "Large Language Models for Automated Data Science: Introducing CAAFE for Context-Aware Automated Feature Engineering", 37th Conference on Neural Information Processing Systems (NeurIPS 2023) Sep. 28, 2023, pp. 1-23.
Li, et al., "Can LLM Already Serve as A Database Interface? A Blg Bench for Large-Scale Database Grounded Text-to-SQLs", 37th Conference on Neural Information Processing Systems (NeurIPS 2023), Nov. 15, 2023, pp. 1-28.
Mark Campbell, "Synthetic Data: How AI is Transitioning from Data Consumer to Data Producer . . . and Why That's Important" IEEE, vol. 52, Issue 10, Sep. 24, 2019, pp. 89-91.
Meng, et al., "Generating Training Data with Language Models: Towards Zero-Shot Language Understanding", arXiv:2202.04538,, Oct. 12, 2022, 19 pages.
Paul Crickard, "Data Engineering with python", Packt Publishing, Oct. 2020, pp. 1-357.
Peng, et al., "Generating Efficient Training Data via LLM-based Attribute Manipulation", arXiv 2307.07099v1, Jul. 14, 2023, 12 pages.
Peng, et al., "Instruction Tuning with GPT-4", arXiv:2304.03277, Apr. 6, 2023, 12 pages.
Schick, et al., "Generating Datasets with Pretrained Language Models", Proceedings of the 2021 Conference on Empirical Methods in Natural Language Processing, Nov. 2021, pp. 6943-6951.
Yang, et al., "FinGPT: Open-Source Financial Large Language Models", arXiv:2306.06031, Jun. 9, 2023, 7 pages.
Ye, et al., "Generating Data for Symbolic Language with Large Language Models", arXiv:2305.13917, May 23, 2023, 26 pages.
Ye, et al., "ZeroGen: Efficient Zero-shot Learning via Dataset Generation," arXiv:2202.07922, Oct. 22, 2022, 17 pages.

* cited by examiner

500A

```
###########################################
#Function: Call LLM to generate a selection of topics related to a theme, in this case a company's domain of
#work such as "health". This list of topics is used to pick from when generating categories for columns.
#Input Argument: The LLM model and the field/domain a company works in
#Returns: A List of topics (expected to be 20 based on the instructions specified in the LLM prompt,
#depending on the LLM's accuracy)
###########################################
def generate_company_data_topics(llm, company_type):

  #Create a LLM prompt based on a specific category provided by a user. Instruct the LLM with a number of
  #topics to return.
  template = """You are a helpful assistant who generates comma separated lists. A user will pass in a
  category, what are 20 topics a dataset might have for it. Write in a comma separated list. ONLY return a
  comma separated list, and nothing more. Remove any text not relevant"""

  system_message_prompt = SystemMessagePromptTemplate.from_template(template)
  human_template = "{company_type}"

  human_message_prompt = HumanMessagePromptTemplate.from_template(human_template)

  chat_prompt = ChatPromptTemplate.from_messages([system_message_prompt,
human_message_prompt])

  chain = LLMChain(
    llm=llm,
    prompt=chat_prompt,
    output_parser=CommaSeparatedListOutputParser()
  )

  rel = chain.run(company_type)
  return rel
```

502 504 506 508

FIG. 5A

500B

```
###########################################
#Function: Asks LLM what the min and max value of a datatype is, cleans the return value, tests if the values
#are expected and repeats the calls until they're ready
#Input Argument: A String value of the datatype
#Returns: A List with the minimum and maximum value
###########################################
def min_max_range_numeric(datatype):                                                          (510)
  prompt = "What is the min and max value of " + datatype + "? Only print the values and print them in a list"   (512)
  response = LLM_API_call(prompt)

  #Split the returned String response into a list based on "," locations                      (514)
  range_dt = response.split(",")
  values = []

  #Loop through the list of split text depending on the datatype to post-process and clean it so only the   (516A)
  #numbers within the text remain
  for word in range_dt:

    #Remove any punctuation first
    final = remove_text_punc(word)

    #Check the datatype and proceed with additional steps to clean the text
    if datatype == "INT":
      try:
        values.append(int(final))
      except:
        return False
    elif datatype == "FLOAT":

      #LLM may add additional characters like +, ^, and x characters in float values to represent float values
      #If the string value has "+" or "x" then LLM  gave a response in the form of a power rather than written
      #out as the full digit
      if "+" in final or "^" in final:

        #LLM output with "+" or "^" have a power in them. Extract the power value in the text
        if "x" in final:
          num = final.split("x")
          try:
            power = num[1][-2:]
          except:
            return False
        if "+" in final:
          num = final.split("+")
          try:
            power = float(num[-1])
          except:
            return False
  •
  •
  •
```

*Continued in FIG. 5C*

FIG. 5B

500C

*Continued from FIG. 5B*

•
•
•

516A

```
        if "^" in final:
            num = final.split("^")
            try:
                power = float(num[-1])
            except:
                return False

        #Test if this is a numeric value by trying the float conversion on the value otherwise return
        #False which will trigger calling this function again to prompt LLM again for the min/max values
        #of the datatype
        try:
            root = float(num[0])
        except:
            return False

        #Calculate the power based on the value extracted above
        final = root * (math.pow(10,power))
        try:
            values.append(float(final))
            continue
        except:
            return False

    #If the returned value is not in a power format, remove any extra punctuation LLM may have
    #added and convert to a float value
    else:
        final = final.replace(".", "")
        try:
            final = float(final)
            values.append(final)
        except:
            print("Could not convert value into a Float type:", final)
            return False
```

518

```
#Test check to see if there are two values left
if len(values) == 2:
    return values
else:
    return False
```

FIG. 5C

500D

```
###########################################
#Function: Call LLM to generate a range of dates to pass to SDGT to create two columns of start and end
#datetimes.
#Input Argument: The LLM model
#Returns: 3 Datetimes to determine the start and end values of one column, and the start and end of a
#second column.
#---------The first two values are the start and end values of the first column.
#---------The second and third value are the start and end values of the second column
###########################################
def llm_generates_date_ranges(llm):                                              (520)

  #Create an LLM prompt that expects as input a month and year to generate times during that period.   (522)
  #LLM prompt includes the form of the datetime to generate values in the same format. This format is
  #specific to a post-processing function called to convert the values into the format that the SDGT requires
  #for generating datetimes.
  #Provide the LLM a note to create different days/hours/minutes/seconds to help diversify the range of
  #values between each datetime, otherwise they may be sequential.
  template = """You are a helpful assistant who generates comma separated lists. User will give you a
  month and year. Generate 3 consecutive datetimes in format '%m/%d/%y %H:%M:%S', use different days,
  hours, minutes, and seconds. ONLY return a comma separated list, and nothing more. Remove any text
  not relevant"""
  system_message_prompt = SystemMessagePromptTemplate.from_template(template)
  human_template = "{text}"

  human_message_prompt = HumanMessagePromptTemplate.from_template(human_template)

  chat_prompt = ChatPromptTemplate.from_messages([system_message_prompt,
        human_message_prompt])

  chain = LLMChain(                                                              (524)
    llm=llm,
    prompt=chat_prompt,
    output_parser=CommaSeparatedListOutputParser_NoSpace()
  )

  #Call LLM to generate datetimes based on a specific month and year
  dates = chain.run("January 2023")

  #Convert the returned values of LLM into datetime format that the SDGT expects
  try:                                                                           (526)
    ranges = []
    datetime_object = datetime.datetime.strptime(dates[0], '%m/%d/%y %H:%M:%S')
    ranges.append(datetime_object)
    datetime_object = datetime.datetime.strptime(dates[1][1:], '%m/%d/%y %H:%M:%S')
    ranges.append(datetime_object)
    datetime_object = datetime.datetime.strptime(dates[2][1:], '%m/%d/%y %H:%M:%S')
    ranges.append(datetime_object)
  except:
    return False
  return ranges                                                                  (528)
```

FIG. 5D

500E 530 534 532

```
###########################################
#Function: Call LLM to generate categories within one topic
#Input Argument: The LLM model, the number of categires requests, the category type, and the maximum
#length of a word based on the Schema definition
#Returns: A list of elements
###########################################
def generate_categories(llm, num_cat=2, cat_type="random topic",  max_length = 18):

  #Create a LLM prompt that takes as input a topic to generate categories based on.
  #Append the number of categories and the maximum length of each word to the prompt.
  template = """You are a helpful assistant who generates comma separated lists. A user will pass in a
  category, and you should generate """  + str(num_cat) + """" different words less than """ +
  str(max_length) + """ letters in that category in a comma separated list. ONLY return a comma separated
  list, and nothing more. Remove any text not relevant"""
  system_message_prompt = SystemMessagePromptTemplate.from_template(template)
  human_template = "{text}"

  human_message_prompt = HumanMessagePromptTemplate.from_template(human_template)

  chat_prompt = ChatPromptTemplate.from_messages([system_message_prompt,
        human_message_prompt])

  chain = LLMChain(
    llm=llm,
    prompt=chat_prompt,
    output_parser=CommaSeparatedListOutputParser()
  )

  #Call LLM to generate categories based on a specific topic
  categories = chain.run(cat_type)
```

FIG. 5E

500F

```
###########################################
#Function: Post-process list of elements created with LLM based on a specific topic in order to remove any
#empty strings generated by LLM.
#Input Argument: A List of words generated by LLM, the LLM Model, the total number of categories, the
#category type, and the maximum length this word should be based on the Schema definition for it
#Returns: A list of elements cleaned from any empty strings
###########################################
def create_categorical_column_values(llm, num_cat, cat_type, max_length):

  #Call LLM Function to generate the category options.  Add +3 to the total number of categories requested
  #so that in 1 LLM Call more options are generated to pick from in case any values are empty strings.
  word_options = generate_categories(llm, num_cat+3, cat_type, max_length)
  total_LLM_Calls = 1

  #Check for empty strings. Only add non-empty strings to a final list of words up to num_cat total words
  my_word_list = []
  total_words = 0
  for word in word_options:
     if total_words < num_cat:
        if word != "":
           #Remove punctuation in word (words if it's a phrase).
           word = word.replace("\n", " ")
           word = word.translate(str.maketrans('', '', string.punctuation))
           my_word_list.append(word)
           total_words += 1

  #Test to check if any strings are empty in case the buffer was insufficient
  total_empty = check_for_empty_strings(my_word_list)
  while total_empty > 0:
     #If there are empty string options, generate more words for the same topic to pick from
     my_word_list = add_words(my_word_list, llm, total_empty, cat_type, max_length)
     total_LLM_Calls += 1
     total_empty = check_for_empty_strings(my_word_list)
  return my_word_list, total_LLM_Calls
```

536 538 540 542

FIG. 5F

500G

544

546

548

550

```
###########################################
#Function: Call LLM to generate two text columns that depend on each other
#Input Argument: The LLM model, the number of categires requests, the category type, and the maximum
#length of a word based on the Schema definition
#Returns: 1. The values of the first column, 2. The values of the second column, 3. Dictionary that maps the
#values from the first column to the second column (extra, not used but saved if needed)
###########################################
def two_column_dependency(llm, num_cat, keywords, max_length=18):

  #Create a LLM prompt to generate pairs of values as pairs in a tuple based on instructions from a user
  template = """You are a helpful assistant who generates comma separated lists.  User will give
  instructions. Creates tuples based on it with words less than """  + str(max_length) + """ letters. ONLY
  return a list of tuples, and nothing more. Remove any text not relevant"""

  system_message_prompt = SystemMessagePromptTemplate.from_template(template)
  human_template = "{text}"

  human_message_prompt = HumanMessagePromptTemplate.from_template(human_template)

  chat_prompt = ChatPromptTemplate.from_messages([system_message_prompt,
        human_message_prompt])

  chain = LLMChain(
    llm=llm,
    prompt=chat_prompt,
    output_parser=CommaSeparatedListOutputParser_NoSpace()
  )

  #Prepare instruction to give to LLM
  info = "List " + str(num_cat)
  for i in range(len(keywords)):
    info += " " + keywords[i]

  pairs = chain.run(info)

  #Post-process the returned output and split it into two separate lists
  cleaned_text = clean_two_columns(pairs)
  col_1, col_2, value_pairs = convert_two_col(cleaned_text)
  return col_1, col_2, value_pairs
```

FIG. 5G

600A 602
604
606

```
#############################################
#Function: Generates integers using SDGT. Takes in as input a range generated by LLM.
#Input Argument: The number of rows and a range to generate integers between
#Returns: A List of integers
#############################################
def SDGT_generate_int(num_rows=50, ranges=(-2147483648,2147483647)):
  sdgt = SDGTcall()
  values = []
  min_val = ranges[0]
  max_val = ranges[1]

  #Create a random set of numbers between these two values
  for i in range(num_rows):
    values.append(sdgt.random_int(min=min_val, max=max_val))
  return values
```

FIG. 6A

600B 608
612
614
616
618

```
#############################################
#Function: Generate two columns of datetimes with SDGT and LLM, where one column is of start datetimes
#and the second column holds an end datetime for each start datetime entry.
#Input Argument: The LLM model and the number of rows to generate data for
#Returns: 1. A List of start datetimes, 2. A List of end datetimes, and 3. the total number of LLM calls that
#were made
#############################################
def SDGT_generate_dependent_datetimes(llm, num_rows=50):

  sdgt = SDGTCall()

  #Generate ranges of dates with LLM
  dates = llm_generates_date_ranges(llm)
  total_LLM_Calls = 1
  #If the LLM datetimes it generates aren't the correct format, keep calling LLM
  while dates is False:
    dates = llm_generates_date_ranges(llm)
    total_LLM_Calls += 1

  #Pass the LLM generated datetime ranges as arguments to SDGT to generate start/end datetime columns
  #Generate the column of Start Datetimes with SDGT
  start_dts = []
  for i in range(num_rows):
    dt = sdgt.date_time_between(dates[0], dates[1])
    start_dts.append(dt)

  #Generate the column of End Datetimes with SDGT
  end_dts = []
  for i in range(num_rows):
    dt = sdgt.date_time_between(dates[1], dates[2])
    end_dts.append(dt)

  return start_dts, end_dts, total_LLM_Calls
```

FIG. 6B

600C

```
###########################################
#Function: SDGT generates a column of words by selecting from a list of elements created with LLM
#Input Argument: The LLM model, the number of categories, the maximum length of a word (based on
#Schema), the category type, and the number of rows
#Returns: A List of words selected from a set of words generated with LLM
###########################################
```

620

```
def sdgt_generate_category_column(llm, num_cat=3, max_length=18, cat_type="exercise", num_rows=50):

  sdgt = SDGTCall()
  punctuation = string.punctuation
```

622

```
  my_word_list, total_LLM_Calls = create_categorical_column_values(llm, num_cat, cat_type, max_length)
```

624

```
  #Check if the list of elements LLM generates have been used in another table first
  #Look up if the list of word choices exists in global variable holding a list of all the lists of elements
  #created so far
  if my_word_list in cat_groupings:

    #Look up the index that this list of elements was inserted in among the rest of lists of elements
    #Use the index below to look up the number of times this list of elements has been used across all
    #tables
```

628

```
    indx = cat_groupings.index(my_word_list)

    #Check the total number of tables the list of elements has been use for
    #Pick a random maximum value of tables that columns should repeat in, e.g., 3, to capture the behavior
    #of potential column values repeating across tables. If the set of categories has been used in 3 tables
    #already, generate a new set. The variance of the list of elements across different tables will eventually
    #query look up times. If certain values exist in more tables than there actually is in a dataset, then the
    #query run times won't be as representative of a customer's actual query times.
```

630

```
    if cat_groupings_count[indx] == 3:
      my_word_list, total_LLM_Calls = create_categorical_column_values(llm, num_cat, cat_type,
        max_length)

    #If less than 3 tables have used this list of elements, increment the count of tables by 1 to reflect that
    #the list of elements is being used in an additional table now as well
```

632

```
    else:
      cat_groupings_count[indx]  += 1

  #If this is the first table the list of elements is going to be used in, append it to the list of lists of
  #categories used so far and initialize the count of tables that it's in to 1
```

634

```
  else:
    cat_groupings.append(my_word_list)
    cat_groupings_count.append(1)

  values = []
```

626

```
  #Pass the generated list of elements to SDGT to pick from
  for i in range(num_rows):
    gen = sdgt.sentence(ext_word_list=my_word_list, nb_words=1)
    gen = gen.replace(".", "")
    values.append(gen)
  return values, total_GPT_Calls
```

FIG. 6C

600D

```
##########################################
#Function: Generate two columns of text that depend on each other based on a list of pairs of words
#created with LLM
#Input Argument: The LLM Model, the number of categories, the maximum length, keywords which explain
#what each column should be about, and the number of rows to generate
#Returns: 1. A List holding the words in the first column, 2. A List holding the words that depend on the first
#column, and 3. The total number of LLM Calls
636 ##########################################
def sdgt_generate_text_dependent_two_columns(llm, num_cat = 20, max_length = 18, keywords=["cities
        and states", "U.S"], num_rows=50):
  sdgt = SDGTCall()
  f = SDGTCall()

640
  #Generate a list of options of words to pick from
  my_word_list_1, my_word_list_2, pairs_map = two_column_dependency(llm, num_cat, keywords,
        max_length)
  total_LLM_Calls = 1

  values_col_1 = []
642 values_col_2 = []
  for i in range(num_rows):

    #Pick a pair of words that depend on each other from the list of generated word pairs
    key_found = False
646 #Safety check so that if a key in a dictionary is not found when trying to pair words, the code will
    #continue running
    while key_found is False:
648   #Pick one word using SDGT's sentence generator.
      gen = sdgt.sentence(ext_word_list=my_word_list_1, nb_words=1)
      gen = string.capwords(gen.replace(".", ""))
      if (gen == "" or gen is None):
        print()
        print("Null gen:", gen)
        print("Word list:", my_word_list_1)
      gen = remove_space(gen)

      #Look up the matching word pair for it
650   try:
        #Look up the paired word
        word_pair = pairs_map[gen]
        values_col_1.append(gen)
        values_col_2.append(word_pair)
        key_found = True
      except:
        key_found = False
644
  return values_col_1, values_col_2, total_LLM_Calls
```

FIG. 6D

900A

```
###########################################
#Function: Call LLM to generate training data for lightweight model (e.g., markov chain) to train using.
#----------Generate comments for a specific use-case, such as doctor/patient
#Input Argument: A path to save the data the LLM generates to and the total number of sentences for LLM
#to generate
#Returns: Nothing
###########################################
def generate_llm_comment_data(llm, file_path, company_type, total_data_to_gen=100):

  f = open(file_path, "w")

  start = time.time()
  sentences = []
  for i in range(total_data_to_gen):
    template = """What is a comment someone in {subject} would tell their user."""
    llm_chain = LLMChain.from_string(llm=llm, template=template)

    output = llm_chain.predict(subject=company_type)
    output = output.replace("\n", "")

    punc = string.punctuation
    p = punc[1]
    output = output.replace(p, "")

    if i == total_data_to_gen - 1:
      f.write(output)
    else:
      f.write(output + "\n")

  end= time.time()
  seconds = round(end-start, 5)
  minutes = round(seconds/60, 5)
  f.close()
```

902, 904, 906, 912, 914, 916, 910

FIG. 9A

900B 918, 920, 922, 924

```
############################################
#Function: Train a Markov Chain model (or another lightweight model).
#Input Argument: A file path to save the Markov Chain model to
#Returns: The trained Markov Chain model
############################################
def train_markov_chains(file_path):
    #Open the data and train the Markov Chain model
    with open(file_path) as f:
        text = f.read()
    # Train the Markovify model on the LLM data generated
    start = time.time()
    markov_model = markovify.Text(text)
    end = time.time()
    seconds = round(end-start, 5)
    minutes = round(seconds/60, 5)
    return markov_model
```

FIG. 9B

900C

```
############################################
#Function: Use the Markovify trained model to generate comments
#Input Argument: The markov model, the total number of comments to generate, and the maximum length
#of a sentence based on the Schema
#Returns: 1. The total seconds it takes to generate all the sentences, 2. The average length of the sentences,
#and 3. The list of sentences
############################################
926 def generate_comments_with_markov(markov_model, total_comments=1, char_length=100):

    #The total length of all the sentences to compute the average length of the sentences at the end
    total_len = 0

    #List to hold all the generated sentences
928 comments = []

    #Start time of generating all the sentences with Markovify
    global_start = time.time()

930 for i in range(total_comments):

        #Start of generating one sentece
        start = time.time()

        #Select a different maximum length of characters, long enough enough to be a comment and but less
        #than the Schema's defined maximum size
934     random_length = random.randint(50, char_length)

        #Generate a sentence
936     resp = markov_model.make_short_sentence(random_length)

        #Re-call Markovify to try generating another sentence if "None" is returned
938     while resp is None:
            resp = markov_model.make_short_sentence(random_length)

        #Remove potential extra characters such as \n
        resp = resp.replace("\n", " ")

940     comments.append(resp)
        total_len += len(resp)

    avg_len = round(total_len/total_comments, 5)
    end = time.time()
    seconds = round(end-start, 5)
    minutes = round(seconds/60, 5)

932 return seconds, avg_len, comments
```

FIG. 9C

900D

```
##########################################
#Function: Train a Markov Chain model on LLM generated data to create comments.
#Input Argument: The field/domain a company works in
#Returns: A List of sentences generated by Markov Chain, these sentences represent comments a company
#might store in their database
##########################################
942 def markov_chain_comments(llm, company_type, num_rows, comment_len):
944     #Save files in the Lakehouse
    lakehouse_root_path = "/lakehouse/default/Files/"

    #Create a file path to save LLM generated data
    data_file =  str(company_type) + "_llm_markov_training_comments"
    file_path = lakehouse_root_path + data_file + ".txt"

    #Create a model path to save the trained markov model
    model_name = str(company_type) + "_gpt_based_markov_model"
    model_path = lakehouse_root_path + model_name + ".pkl"

    #Check if a markov model for this kind of company has been created before and create one if not
946     #Check if LLM generated data already exists
    file_exists = os.path.isfile(file_path)
    if file_exists:
        f = 1 #placeholder variable
    else:
        generate_llm_comment_data(llm, file_path, company_type, total_data_to_gen=100)
948     #Check if a markov model was created for it
    model_exists = os.path.isfile(model_path)
    if model_exists:
        m = 1 #placeholder variable
    else:
        #Create a Markov Model
        trained_markov_model = train_markov_chains(file_path)
        #Save model
        pickle.dump(trained_markov_model, open(model_path, "wb"))
950     #Generate the comments with markov model

    #Load the pickled model when generating data for a column of comments
    mv_model = pickle.load(open(model_path, 'rb'))

    #Run the loaded model to generate comments
    total_sec, avg_length, comments = generate_comments_with_markov(mv_model,
            total_comments=num_rows, char_length=comment_len)
    return comments
```

FIG. 9D

1000

1002

1004

| Patient # | Check-In Time | Check-Out Time | New Patient? | Reason for Visit | Patient Height (in.) | Patient Weight (lb.) | Doctor's Comments |
|---|---|---|---|---|---|---|---|
| 1 | 1/21/2023 10:53:12 | 1/21/2023 13:39:41 | Y | Diet | 63 | 155 | Make sure to nourish your body and mind healthy! |
| 2 | 1/21/2023 5:35:23 | 1/21/2023 8:05:35 | N | Exercise Habits | 68 | 199.8 | It's important to stay active and eat a balance diet. |
| 3 | 1/20/2023 18:12:30 | 1/22/2023 11:53:31 | Y | Allergies | 62 | 162 | Be sure to get plenty of water is also important. |
| 4 | 1/21/2023 4:48:27 | 1/21/2023 21:15:13 | Y | Diet | 72 | 225 | Take care of your health is a step in the best direction. |
| 5 | 1/21/2023 1:25:24 | 1/22/2023 4:52:53 | N | Diet | 65 | 236 | It's important to stay hydrated and get plenty of water. |
| ⋮ | ⋮ | ⋮ | ⋮ | ⋮ | ⋮ | ⋮ | ⋮ |
| *n* | 1/21/2023 14:43:44 | 1/22/2023 15:50:02 | N | Allergies | 74 | 272 | Good job taking the first steps towards improving your health! |

FIG. 10

SYNTHETIC DATA GENERATION UTILIZING GENERATIVE ARTIFICIAL INTELLIGENCE AND SCALABLE DATA GENERATION TOOLS

BACKGROUND

Synthetic data is generated for various reasons. For example, synthetic data may be generated for use in performance benchmarking in place of actual customer data to ensure privacy for customers. Depending on the implementation, a workload utilizing synthetic data may require thousands, millions, or greater data points. Furthermore, some workloads require synthetic data including coherent sentences, such as simulating a doctor's recommendation to a patient or comments the patient made to the doctor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for synthetic data generation utilizing generative artificial intelligence and scalable data generation tools. In an aspect, a prompt comprising a domain is provided to a generative artificial intelligence (AI) model (e.g., a large language model (LLM) or other type of generative AI model). A data parameter associated with the domain that specifies a boundary for synthetic values in a column of data is received from the generative AI model. An argument comprising the data parameter is provided to a scalable data generation tool (SDGT) configured to generate data based on the data parameter. Scaled data is received from the SDGT. The scaled data comprises a column of synthetic data values wherein each synthetic data value is within the boundary specified by the data parameter. An emulated workload is caused to utilize synthetic data comprising the scaled data to generate a performance benchmark for the domain.

In a further aspect, synthetic sentence data is generated. Responsive to the prompt provided to the generative AI model, training data generated by the LLM based on the prompt is received. A lightweight model is trained to generate synthetic sentences based on the received training data. Synthetic sentence data is received from the lightweight model. The synthetic sentence data is appended to the scaled data to generate the synthetic data.

In a further aspect, a schema file comprising metadata associated with the domain is received. The prompt is generated based on the schema file.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 5A shows an example code fragment for generating categories for a domain, in accordance with an example embodiment.

FIGS. 5B and 5C show example code fragments for determining a minimum and maximum value for a datatype, in accordance with an example embodiment.

FIG. 5D shows an example code fragment for generating a range of dates, in accordance with an example embodiment.

FIG. 5E shows an example code fragment for generating a categorical list of elements, in accordance with an embodiment.

FIG. 5F shows an example code fragment for calling a function to post-process categorical data parameters generated by executing the code fragment of FIG. 5E, in accordance with an example embodiment.

FIG. 5G shows an example code fragment for generating columns with dependencies, in accordance with an example embodiment.

FIG. 6A shows an example code fragment for utilizing a SDGT to generate a column of numeric data, in accordance with an example embodiment.

FIG. 6B shows an example code fragment for utilizing a SDGT to generate columns with a range of dates, in accordance with an example embodiment.

FIG. 6C shows an example code fragment for utilizing a SDGT to generate a column of categorical data, in accordance with an example embodiment.

FIG. 6D shows an example code fragment for utilizing a SDGT to generate two columns of data based on pairs of words, in accordance with an example embodiment.

FIG. 9A shows an example code fragment for generating training data for a lightweight model, in accordance with an example embodiment.

FIG. 9B shows an example code fragment for training a lightweight model, in accordance with an example embodiment.

FIG. 9C shows an example code fragment for generating synthetic sentence data utilizing a lightweight model, in accordance with an example embodiment.

FIG. 9D shows an example code fragment for generating synthetic sentence data utilizing a lightweight model, in accordance with an example embodiment.

FIG. 10 shows a table of synthetic data, in accordance with an example embodiment.

Figure 1:
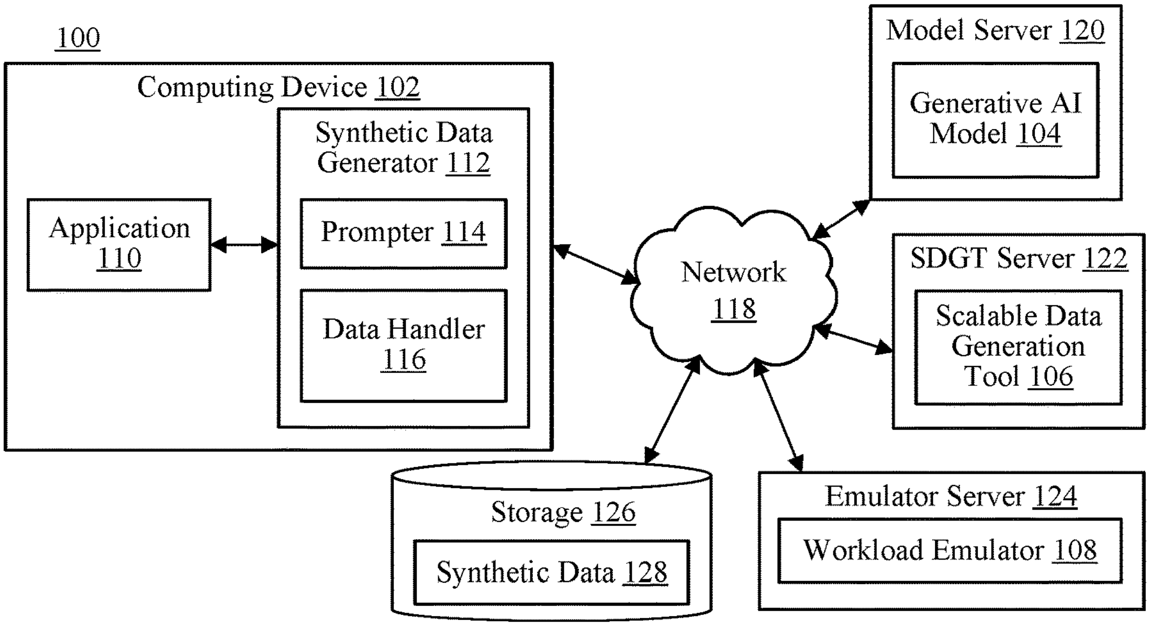
FIG. 1 shows a block diagram of a system for generating synthetic data, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Synthetic Data Generation

Embodiments of the present disclosure relate to generation of synthetic data, e.g., for use in benchmark testing a system or data platform. Synthetic data, or "synthetic seed data," may be used to represent real datasets rather than utilizing actual customer data for various reasons, e.g., to hide confidential information, to protect customer privacy, etc. A user or an organization utilizes synthetic data to test how a system or data platform operates on datasets. The amount of synthetic data required for testing such systems or data platforms may include thousands, millions, or greater numbers of data points. Furthermore, users or organizations may operate in various domains or fields (e.g., a healthcare domain, a finance domain, a technology domain, an energy domain, etc.). In this context, the user or organization may desire testing their system or data platform against synthetic data related to their domain.

Embodiments of the present disclosure leverage generative artificial intelligence (AI) models to generate data parameters for use in generating synthetic data, and in particular synthetic data related to a domain. A generative AI model is a model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. A token may be a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image).

A large language model (LLM) is a language model that has a high number of model parameters. For instance, an LLM may have millions, billions, trillions, or even greater numbers of model parameters. Model parameters of an LLM are the weights and biases the model learns during training. An LLM is (pre-)trained using self-supervised learning and/or semi-supervised learning. For instance, an LLM may be trained by exposing the LLM to (e.g., large amounts of) text (e.g., predetermined datasets, books, articles, text-based conversations, webpages, transcriptions, forum entries, and/or any other form of text and/or combinations thereof). Training data may be provided from a database, from the Internet, from system, and/or the like. Furthermore, an LLM may be fine-tuned using Reinforcement Learning with Human Feedback (RLHF), where the LLM is provided the same input twice and provides two different outputs and a user ranks which output is preferred. In this context, the user's ranking is utilized to improve the model. Further still, an LLM may be trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks). Additional details regarding transformer-based LLMs are described with respect to FIG. 13, as well as elsewhere herein.

In some implementations of synthetic data generation, generative AI, such as LLMs, is used to generate the synthetic seed data to represent real datasets rather than utilizing actual customer data (e.g., due to privacy regulations, confidential information, etc.). However, as noted above and depending on the implementation, a workload utilizing synthetic data may require thousands, millions, or greater data points. Generative AI alone may require a long period of time and/or a large number of resources to generate synthetic data to this scale. In an alternative implementation of synthetic data generation, a scalable data generation tool (SDGT) is used to quickly generate large amounts of synthetic data. However, an SDGT may lack customizability without direct user input, thereby requiring a user to implement lengthy arguments that may require a long time to generate for a workload. Furthermore, a new or unique workload would require a new argument to be written for the SDGT.

Methods, systems, and computer-readable storage media described herein leverage generative AI models to generate data parameters that are provided to an SDGT for use in generating synthetic data. For example, in an embodiment, a prompt related to a domain is provided to a generative AI model (such as an LLM). The LLM generates data parameters associated with the domain. Each data parameter specifies a boundary for synthetic values in to-be-generated synthetic data. Example data parameters include, but are not limited to, a range data parameter that specifies a first range subset (e.g., a range of values to select as a start of a range) and a second range subset (e.g., a range of values greater than or subsequent to the first range subset to select as the end of the range), a numeric data parameter that specifies a range of numbers, and a categorical data parameter that specifies a categorical list of elements. An argument comprising at least one of the data parameters is provided to an SDGT configured to generate data based on the data parameter. The SDGT generates scaled data comprising a column of synthetic data values. Each of the synthetic data values are within a boundary specified by the data parameter in the argument. By leveraging a generative AI model and an SDGT in this manner, embodiments described herein are able to generate large amounts of synthetic data catered to a particular domain at a faster rate and utilizing fewer compute resources.

In some implementations, a user or organization may require synthetic data that includes coherent sentences, such as simulating a doctor's recommendation to a patient or comments the patient made to the doctor. Embodiments described herein may generate "synthetic sentence data" in various ways. For instance, and as described with respect to FIGS. 7-10 (as well as elsewhere herein), techniques for generating synthetic sentence data leverage a lightweight model. In this context, a generative AI model in accordance with an embodiment generates training data for the lightweight model. The lightweight model is trained to generate synthetic sentences based on the generated training data. By leveraging a lightweight model in this way, some embodiments described herein are able to generate synthetic sentence data that is coherent and catered to a particular domain at a faster rate and using less compute resources.

Systems, devices, and apparatuses may be configured in various ways for generating synthetic data utilizing generative AI. For example, FIG. 1 shows a block diagram of a system 100 for generating synthetic data, in accordance with an example embodiment. System 100 comprises a computing device 102, a model server 120, an SDGT server 122, an emulator server 124, and a storage 126. Computing device 102, model server 120, SDGT server 122, emulator server 124, and storage 126 are communicatively coupled via network 118. Network 118 may comprise one or more networks such as local area networks (LANs), wide area networks (WANs), enterprise networks, the Internet, etc., and may include one or more of wired and/or wireless portions. The features of system 100 are described in detail as follows.

Storage 126 stores data used by and/or generated by computing device 102, model server 120, SDGT server 122, emulator server 124, and/or components thereof and/or services executing thereon. For instance, as shown in FIG. 1, storage 126 stores synthetic data 128. As described further herein, synthetic data 128 is generated utilizing generative AI and a SDGT. Synthetic data 128 in accordance with an embodiment is columnized data comprising hundreds, thousands, millions of, and/or even greater rows of data. As shown in FIG. 1, storage 126 is external to computing device 102, model server 120, SDGT server 122, and emulator server 124; however, it is also contemplated that all or a portion of storage 126 may be internal to computing device 102, model server 120, SDGT server 122, and/or emulator server 124. In accordance with an embodiment, storage 126 is a remote storage accessible over network 118 (e.g., a web storage, a blob storage, a networked file system, a cloud storage, etc.).

Computing device 102 may be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. In accordance with an embodiment, computing device 102 is associated with a user (e.g., an individual user, a group of users, an organization, a family user, a customer user, an employee user, an admin user (e.g., a service team user, a developer user, a management user, etc.), etc.). Computing device 102 is configured to execute an application 110 and a synthetic data generator 112. As shown in FIG. 1, synthetic data generator 112 is external to application 110. Alternatively, application 110 may include logic to perform some or all of the functions of synthetic data generator 112. In accordance with an embodiment, application 110 enables a user to interface with model server 120, SDGT server 122, and/or emulator server 124.

Model server 120, SDGT server 122, and emulator server 124 are network-accessible servers (or other types of computing devices). In accordance with an embodiment, one or more of model server 120, SDGT server 122, and emulator server 124 are incorporated in a network-accessible server set (e.g., a cloud-based environment, an enterprise network server set, and/or the like). Furthermore, as shown in FIG. 1, each of model server 120, SDGT server 122, and emulator server 124 are a single server or computing device. Alternatively, any of model server 120, SDGT server 122, and emulator server 124 may be implemented across multiple servers or computing devices (e.g., as a distributed service). Each of model server 120, SDGT server 122, and emulator server 124 are configured to execute services and/or store data. For instance, as shown in FIG. 1, model server 120 is configured to execute a generative AI model 104, SDGT server 122 is configured to execute a scalable data generation tool 106 ("SDGT 106" herein), and emulator server 124 is configured to execute a workload emulator 108. In accordance with an embodiment, application 110 and/or synthetic data generator 112 interface with generative AI model 104, SDGT 106, and/or workload emulator 108 over network 118.

Application 110 comprises an application configured to utilize synthetic data generator 112 to generate synthetic data and cause the execution of workloads. For example, application 110 may be an application for benchmark testing data platforms and/or generating synthetic data for use in benchmark testing data platforms. Application 110 in accordance with an embodiment sends information ("schema information") to synthetic data generator 112 to cause the generation of synthetic data. Alternatively, application 110 receives schema information from another computing device (not pictured in FIG. 1) to send to synthetic data generator 112 to cause the generation of synthetic data. In accordance with an embodiment, a user provides the schema information to application 110 via a user interface of computing device 102. In accordance with another embodiment, the schema information is provided to application 110 in a "schema file." Alternatively, application 110 obtains a schema file from a data store (e.g., memory of computing device 102, storage 126, and/or another data store not shown in FIG. 1). In another alternative, application 110 generates the schema file. A schema file comprises the schema information as metadata associated with a user, an organization, and/or a domain. Examples of schema information includes, but is not limited to, the domain type (e.g., "healthcare," "finance," "energy," "technology," etc.), the name of an organization or customer, names of columns of data to generate, types of data in a column to generate, and/or any other metadata or other information suitable for generation of synthetic data.

Synthetic data generator 112 is configured to generate synthetic data (e.g., synthetic data 128) and cause emulation of workloads. Synthetic data generator 112 may be a service executed by computing device 102 or implemented by application 110. Optionally, logic for performing some or all of the functions of synthetic data generator 112 may be imported into a computer program (e.g., as a library). As shown in FIG. 1, synthetic data generator 112 includes a prompter 114 and a data handler 116. Prompter 114 comprises logic for receiving schema information, generating prompts (e.g., as further described with respect to FIGS. 11 and 12, as well as elsewhere herein), providing prompts to generative AI model 104 (e.g., as an application programming interface (API) call of generative AI model 104), receiving responses from generative AI model 104 (e.g., as an API call response), storing data parameters generated by generative AI model 104 in a data store (e.g., storage 126), and/or performing other functions associated with prompting a generative AI model (such as generative AI model 104). In accordance with an embodiment, prompter 114 includes an interface for communicating with generative AI model 104 via network 118.

Data handler 116 comprises logic for obtaining data parameters generated by generative AI model 104 (e.g., from prompter 114, from generative AI model 104 (e.g., as an API call response), from storage 126, and/or the like), generating an argument comprising one or more data parameters generated by generative AI model 104, transmitting an argument to SDGT 106 (e.g., as an API call of SDGT 106), receiving responses from SDGT 106 (e.g., as an API call response), causing workload emulator 108 to generate a performance benchmark utilizing data generated by SDGT 106, training a lightweight model to generate synthetic sentence data (e.g., as described further with respect to FIGS. 5 and 6, as well as elsewhere herein), generating synthetic data (e.g., based on scaled data received from SDGT 106 (e.g., as described further with respect to FIGS. 2 and 3, as well as elsewhere herein), based on scaled data received from SDGT 106 and synthetic sentence data received from a lightweight model (e.g., as described further with respect to FIGS. 5 and 6, as well as elsewhere herein), and/or as described elsewhere herein and/or as would otherwise be understood by a person ordinarily skilled in the relevant art(s) having benefit of the present disclosure), storing scaled data, synthetic data, and/or synthetic sentence data in a data store (e.g., storage 126), accessing a data store to obtain stored data, providing synthetic data to application 110, causing a data analytics engine (not shown in FIG. 1) to generate expanded data based on synthetic data, and/or performing other functions associated with generating synthetic data and/or causing emulation of workloads utilizing synthetic data. In accordance with an embodiment, data handler 116 includes an interface for communicating with generative AI model 104, SDGT 106, and/or workload emulator 108 via network 118.

Generative AI model 104 is configured to generate data parameters based on a received prompt. Generative AI model 104 may be any type of generative AI model capable of generating data parameters based on prompts received from synthetic data generator 112. In accordance with an embodiment, generative AI model 104 is an LLM. Generative AI model 104 may be trained using public information (e.g., information collected and/or scrubbed from the Internet) and/or data stored by an administrator of model server 120 (e.g., stored in memory of model server 120 and/or. In accordance with an embodiment, generative AI model 104 is an “off the shelf” model trained to generate complex, coherent, and/or original content based on (e.g., any) prompt. In an alternative embodiment, generative AI model 104 is a specialized model trained to generate data parameters for a domain based on prompts. Example code excerpts including prompts and API calls transmitted to generative AI model 104 are described with respect to FIGS. 5A-5G, 6A-6C, 9A, and 9D. Additional details regarding the operation and training of generative AI models such as generative AI model 104 are described in Section V of the present disclosure, as well as elsewhere herein. Data parameters generated by generative AI model 104 specify a boundary for synthetic values in a portion of data (e.g., a column of synthetic data).

SDGT 106 is configured to generate scaled data based on a received argument. In accordance with an embodiment, SDGT 106 is a non-AI scalable data generation tool. SDGT 106 includes logic for generating scaled data based on data parameters included in received arguments. In accordance with an embodiment, SDGT 106 comprises one or more functions that generate scaled data based on one or more data parameters. For instance, SDGT 106 in accordance with an embodiment comprises a function that selects a number and/or date from a range parameter. In another example embodiment, SDGT 106 comprises a function that selects (e.g., randomly) an element (e.g., text, a phrase, a number, etc.) from a categorical list of elements. SDGT 106 is configured to generate hundreds, thousands, millions, or even greater numbers of synthetic data values based on received arguments. In accordance with an embodiment, each synthetic data value is within a boundary specified by a respective data parameter. In accordance with an embodiment, SDGT 106 generates scaled data as a table of synthetic data values, wherein columns of synthetic data values correspond to respective data parameters generated by generative AI model 104. An example table of synthetic data values is described with respect to FIG. 10. Example code excerpts including arguments transmitted to SDGT 106 are described with respect to FIGS. 6A-6C.

Workload emulator 108 is configured to emulate workloads utilizing synthetic data to generate a performance benchmark for a domain. In accordance with an embodiment, workload emulator 108 performs and/or otherwise manages a load test to evaluate the performance of a system and/or data platform based on synthetic data generated by synthetic data generator 112 (e.g., synthetic data 128). A workload may comprise one or more tasks and/or sub-tasks the system and/or data platform is to perform. By utilizing synthetic data, the performance of the system and/or data platform may be tested without exposing confidential and/or private information. Furthermore, by utilizing synthetic data generator 112, the synthetic data is catered to the domain the system and/or data platform is used for, thereby increasing the accuracy and quality of performance benchmarks.

Figure 2:
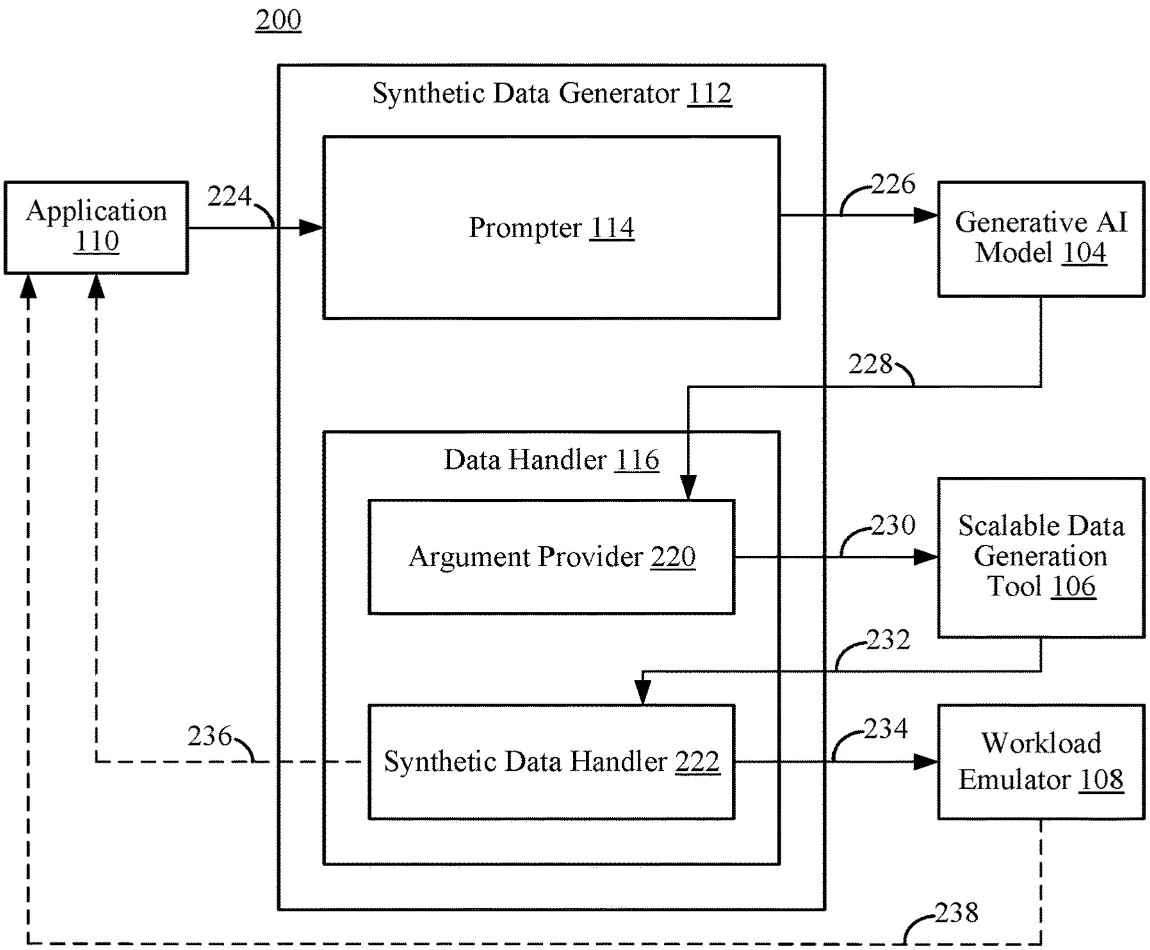
FIG. 2 shows a block diagram of a system for generating synthetic data, in accordance with another example embodiment.
Figure 3:
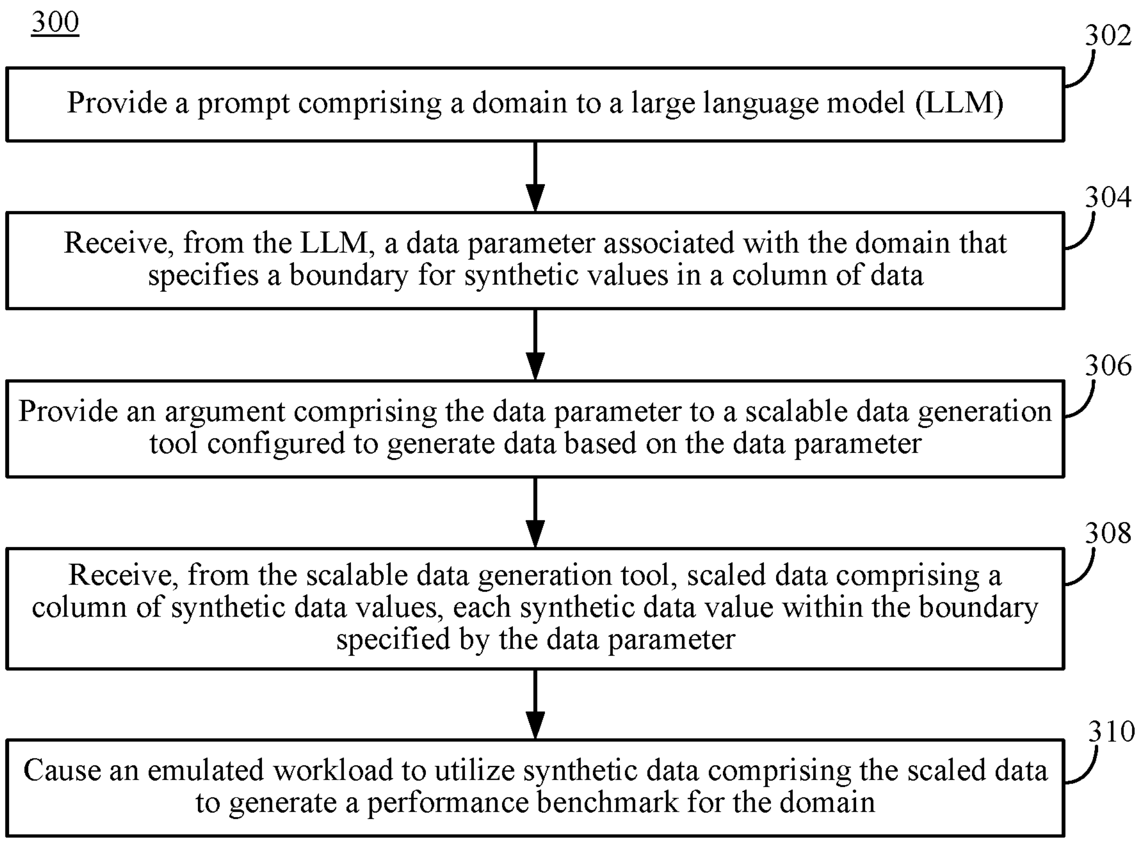
FIG. 3 shows a flowchart of a process for generating synthetic data, in accordance with an example embodiment.

Synthetic data generator 112 may be configured to generate synthetic data in various ways, in embodiments. For example, FIG. 2 shows a block diagram of a system 200 for generating synthetic data, in accordance with another example embodiment. As shown in FIG. 2, system 200 comprises generative AI model 104, SDGT 106, workload emulator 108, application 110, and synthetic data generator 112 (comprising prompter 114 and data handler 116), as respectively described with respect to FIG. 1. As also shown in FIG. 2, data handler 116 comprises an argument provider 220 and a synthetic data handler 222. To better illustrate embodiments for generating synthetic data, system 200 is described with respect to FIG. 3. FIG. 3 shows a flowchart 300 of a process for generating synthetic data, in accordance with an example embodiment. Synthetic data generator 112 may operate according to flowchart 300 in embodiments. Not all steps of flowchart 300 need be performed in all embodiments. Further structural and operational embodiments will be apparent to persons skilled in the relevant art(s) based on the following descriptions of FIGS. 2 and 3.

Flowchart 300 begins with step 302. In step 302, a prompt comprising a domain is provided to an LLM. For example, prompter 114 provides a prompt 226 comprising a domain to generative AI model 104. Prompter 114 in accordance with an embodiment is configured to (e.g., automatically) generate prompt 226 based on schema information 224 received from application 110. Alternatively, prompter 114 obtains schema information from a data store (e.g., storage 126 of FIG. 1, or another data store as described elsewhere herein). In another alternative, a user provides prompt 226 to prompter 114 via a user interface of synthetic data generator 112 and/or application 110. In any of these described cases, schema information and/or prompt 226 comprises a domain to be used by generative AI model 104 to generate data parameters. Furthermore, prompt 226 in accordance with an embodiment specifies additional information for generating data parameters. For instance, prompt 226 may specify a type of category, a datatype of a category, a number of elements to generate in a categorical list, a timeframe for a range of dates, a maximum length of an element or phrase to be generated, keywords for generating dependent columns, and/or any other arguments or other information useable by generative AI model 104 to generate data parameters, as described elsewhere herein. In accordance with an embodiment, prompt 226 comprises multiple sub-prompts. Alternatively, prompter 114 provides prompts sequentially to generative AI model 104. In accordance with a further embodiment, prompter 114 provides a prompt to generative AI model 104 that depends on a previous response from generative AI model 104. For instance, prompter 114 in a non-limiting example provides a first prompt to generate a list of categories for columns in a dataset and a second prompt to generate a categorical list of elements for one of the categories generative AI model 104 provided in a response to the first prompt. Further embodiments regarding providing prompts to generative AI models are described with respect to FIGS. 5A-5G, as well as elsewhere herein.

In step 304, a data parameter associated with the domain is received from the LLM. The data parameter specifies a boundary for synthetic values in a column of data. For example, argument provider 220 receives response 228 comprising a data parameter associated with the domain specified in prompt 226. Alternatively, prompter 114 receives response 228 and provides the data parameter included therein to argument provider 220. In either scenario, the data parameter specifies a boundary for synthetic values in a column of data to be generated by SDGT 106. In accordance with an embodiment, argument provider 220 receives multiple data parameters at a time from generative AI model 104. Data parameters may be dependent on each other (e.g., start and end data parameters for generating a range of dates, minimum and maximum values for numeric data, two or more categorical lists of elements that depend on each other, etc.).

In step 306, an argument comprising the data parameter is provided to an SDGT configured to generate data based on the data parameter. For example, argument provider 220 provides an argument 230 comprising the data parameter received in response 228 to SDGT 106 to cause SDGT 106 to generate data based on the data parameter. In accordance with an embodiment, argument 230 is provided to SDGT in an API call. In accordance with another embodiment, SDGT is a library of code imported into synthetic data generator 112 and argument 230 is a function call of the library. In accordance with an embodiment, argument 230 comprises multiple data parameters (e.g., dependent data parameters, ranges of data parameters, etc.). Furthermore, argument 230 in accordance with an embodiment specifies how many rows of data scalable data generation tool 106 is to generate based on the provided data parameter(s). Additional details regarding providing arguments to an SDGT are described with respect to FIGS. 6A-6D, as well as elsewhere herein.

In step 308, scaled data comprising a column of synthetic data values is received from the SDGT. Each synthetic data value is within the boundary specified by the data parameter. For example, synthetic data handler 222 receives scaled data 232 from SDGT 106. Scaled data 232 comprises one or more columns of synthetic data values generated by SDGT 106. The synthetic data values generated based on arguments comprising data parameters are within the boundary specified by the respective data parameter. In some embodiments, scaled data 232 comprises data generated without data parameters generated by generative AI model 104. In some embodiments, SDGT 106 generates columns of data and appends them to generate scaled data 232 as a table based on multiple arguments and/or sub-arguments provided by argument provider 220. Alternatively, synthetic data handler 222 receives scaled data 232 and appends the columns to a table maintained by synthetic data handler 222 to generate synthetic data (e.g., synthetic data 128). In accordance with an embodiment, synthetic data handler 222 stores generated synthetic data in a data store (e.g., in storage 126 of FIG. 1 as synthetic data 128). Alternatively, or additionally, synthetic data handler 222 provides synthetic data in a transmission 236 to application 110. In this context, application 110 may utilize the synthetic data for further analysis, review, and/or display in a graphic user interface (GUI) of application 110 (not shown in FIG. 2). In accordance with an embodiment, synthetic data handler 222 provides the synthetic data to a data analytics engine (not shown in FIG. 2) to expand the synthetic data into a larger dataset (e.g., millions, billions, or even greater numbers of rows).

In step 310, an emulated workload is caused to utilize synthetic data comprising the scaled data to generate a performance benchmark for the domain. For example, synthetic data handler 222 provides a workload call 234 to workload emulator 108 to cause workload emulator 108 to emulate a workload utilizing synthetic data comprising scaled data 232 to generate a performance benchmark 238 for the domain included in prompt 226. In accordance with an embodiment, performance benchmark 238 is provided to application 110 for further analysis, review, and/or display in a GUI of application 110.

Figure 4A:
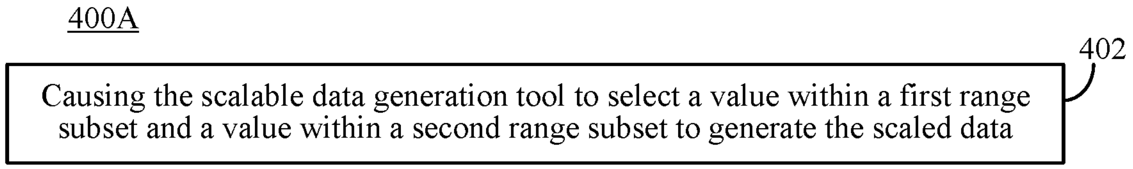
FIG. 4A shows a flowchart of a process for causing a scalable data generation tool to generate scaled data, in accordance with an example embodiment.

Synthetic data generator 112 may operate in various ways to cause an SDGT to generate scaled data, in embodiments. For instance, FIG. 4A shows a flowchart 400A of a process for causing a scalable data generation tool to generate scaled data, in accordance with an example embodiment. Flowchart 400A is a further embodiment of step 306 of flowchart 300 as described with respect to FIG. 3. Synthetic data generator 112 may operate according to flowchart 400A in embodiments. Flowchart 400A need not be performed in all embodiments. Further structural and operational embodiments will be apparent to persons skilled in the relevant art(s) based on the following description of FIG. 4A with respect to FIG. 2.

Flowchart 400A includes step 402. In step 402, the SDGT is caused to select a value within a first range subset and a value within a second range subset to generate the scaled data. For example, argument provider 220 provides argument 230 to SDGT 106 to cause SDGT 106 to select a value within a first range subset and a value within a second range subset to generate scaled data 232. In this context, the data parameter included in argument 230 is a range parameter that specifies the first and second range subsets. The range subsets may be ranges of any type of numeric data (e.g., datetimes, integers, decimals, etc.). Further details regarding causing SDGT 106 to select values within first and second range subsets are described with respect to FIG. 6B, as well as elsewhere herein.

Figure 4B:
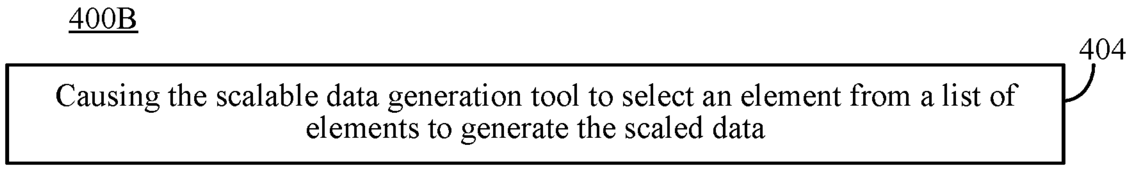
FIG. 4B shows a flowchart of a process for causing a scalable data generation tool to generate scaled data, in accordance with an example embodiment.

As described with respect to FIG. 4A, synthetic generator 112 may operate in various ways to cause an SDGT to generate scaled data, in embodiments. For instance, FIG. 4B shows a flowchart 400B of a process for causing a scalable data generation tool to generate scaled data, in accordance with an example embodiment. Flowchart 400B is a further embodiment of step 306 of flowchart 300 as described with respect to FIG. 3. Synthetic data generator 112 may operate according to flowchart 400B in embodiments. Flowchart 400B need not be performed in all embodiments. Further structural and operational embodiments will be apparent to persons skilled in the relevant art(s) based on the following description of FIG. 4B with respect to FIG. 2.

Flowchart 400B includes step 404. In step 404, the SDGT is caused to select an element from a list of elements to generate the scaled data. For example, argument provider 220 provides argument 230 to SDGT 106 to cause SDGT 106 to select an element from a list of elements to generate scaled data 232. In this context, the data parameter included in argument 230 specifies a categorical list of elements. Further details regarding causing SDGT 106 to select from a categorical list of elements are described with respect to FIGS. 6C and 6D, as well as elsewhere herein.

Synthetic data generator 112 is described as utilizing a generative AI model (e.g., generative AI model 104) and an SDGT (e.g., SDGT 106) to generate synthetic data. In accordance with an embodiment, synthetic data generator 112 comprises logic that, when executed, transmits API calls to (and/or executes functions of) generative AI model 104 to generate data parameters and/or to SDGT 106 to generate scaled data. To better understand the operation of synthetic data generator 112 interfacing with generative AI model 104 to generate data parameters, synthetic data generator 112 of FIG. 2 is described with respect to FIGS. 5A-5G. FIGS. 5A-5G illustrate respective code fragments for utilizing a generative AI model. FIGS. 5A-5G are described with respect to a running example in a health domain; however, implementations of synthetic data generator 112, generative AI model 104, and SDGT 106 are not limited to such a domain. Further structural and operational embodiments will be apparent to persons skilled in the relevant art(s) based on the following descriptions of FIGS. 5A-5G with respect to FIG. 2.

Depending on the implementation, synthetic data generator 112 may generate synthetic data for a domain based on categories (e.g., topics) included in schema information (e.g., a schema file). Alternatively, synthetic data generator 112 leverages generative AI model 104 to generate categories. Consider the example code fragment 500A shown in FIG. 5A. Code fragment 500A defines a function 502 called "generate_company_data_topics( )" that creates a prompt and provides the prompt to generative AI model 104 to generate categories for a domain. Function 502 comprises a prompt block 504, a chain definition 506, and a run block 508. Function 502 accepts the generative AI model ("llm" in function 502) and a domain ("company_type" in function 502) as arguments.

Prompt block 504 creates a prompt to be provided to generative AI model 104. In prompt block 504, a prompt is defined that tasks generative AI model 104 with generating a comma separated list of twenty topics that a dataset may include for a particular category. In other words, the prompt requests generative AI model 104 to generate topics for a domain. To generate the prompt, a system prompt template for a system role is generated using the SystemMessagePromptTemplate.from_template(template) function. A human prompt template for a human role is also generated, which includes a declaration of a "human_template":

```
human_template="{company_type}"
```

In this declaration, " " {company_type}" " refers to the domain input in the function call of function 502. The system prompt template and the human prompt template are combined in a chat prompt template declared as "chat_prompt."

In chain definition 506, an LLMChain defines the generative AI model that will be called to generate the list of categories (e.g., generative AI model 104), the prompt that will be provided to the model, and that the output is to be in a comma separated list. In run block 508, the chain runs with "company_type" passed as an argument thereof. This causes the company_type in a call of function 502 to be passed into the human prompt of the chat prompt created in prompt block 504. For instance, if function 502 was called using an execution of "generate_company_data_topics (generative AI model 104, healthcare)", a prompt would be provided to generative AI model 104 to cause generative AI model 104 to generate a comma separated list of 20 topics a dataset for a healthcare domain might have.

Thus, an example code fragment for generating data topics for a domain has been described with respect to FIG. 5A. In FIG. 5A, the prompt transmitted to generative AI model 104 requests 20 categories to be generated; however, embodiments described herein are not so limited. For instance, a prompt may ask generative AI model 104 to generate fewer (e.g., one, two, ten, etc.) or greater (e.g., 21, 30, 100, etc.) categories. Furthermore, the number of categories to be created may be passed to the prompt as an argument of function 502 (e.g., function 502 may be modified to accept the generative AI model, the domain, and the number of categories as arguments). By utilizing a generative AI model to generate data topics, embodiments described herein are able to generate synthetic data from (e.g., only) a domain as input to a synthetic data generator. Therefore, less time is required in generating schema information.

Synthetic data generator 112 of FIGS. 1 and 2 may cause generative AI model 104 to generate a data parameters in various ways. For instance, synthetic data generator 112 may be configured to cause generative AI model 104 to generate a data parameter that specifies a range of values. For example, FIGS. 5B and 5C show example code fragments 500B and 500C for determining a minimum and maximum value for a datatype, in accordance with an example embodiment. Code fragments 500B and 500C define a function 510 that utilizes generative AI model 104 to generate a minimum and maximum value data parameter for a datatype. Function 510 comprises a prompt block 512, a split block 514, post-processing blocks 516A and 516B, and test block 518. Function 510 accepts a "datatype" (e.g., a type of data for a category (e.g., an integer type, a float type, a character type, etc.)) as an argument. Function 510 relates to minimum and maximum values of numeric datatypes (e.g., integer or float types).

Prompt block 512 defines a prompt that requests a minimum and maximum value of the datatype passed to function 510. Prompt block 512 includes an API call to generative AI model 104. In the context of prompt block 512, the API call does not use prompt pre-processing (e.g., the pre-processing in prompt block 504 of FIG. 5A). However, it is also contemplated that an alternative implementations of synthetic data generator 112 utilizing function 510 includes pre-processing similar to (or different from) the pre-processing described with respect to prompt 504 of FIG. 5A.

Split block 514, post-processing blocks 516A and 516B, and test block 518 prepare the response generated by generative AI model 104 in an expected format. For instance, split block 514 splits the response from generative AI model 104 based on commas in the response. Since prompt block 512 prompted generative AI model 104 to generate the output as a list, the output should be a first number and a second number separated by a comma. Post-processing blocks 516A and 516B loop through the output of split block 514 to clean the text until only numbers within the text remain. Test block 518 tests the post-processed output to see if two values (e.g., a minimum value and a maximum value) remain. If so, test block 518 outputs the values.

In embodiments, a datatype is assigned to categories (e.g., the categories generated utilizing code fragment 500A, categories indicated in a schema file, and/or the like). In some embodiments, a schema file indicates the datatype assigned to a category. Alternatively, synthetic data generator 112 and/or generative AI model 104 assigns the datatype to the category.

Code fragments 500B and 500C have been described with respect to determining minimum and maximum values for datatypes; however, it is also contemplated herein that synthetic data generator 112 may be configured to determine a minimum and maximum value for a particular category. In this context, function 510 may be modified to accept datatype and the category name as arguments and the prompt in prompt block 512 may be modified to prompt generative AI model 104 to determine a minimum and maximum value for a particular category. For instance, an example modified prompt is provided as follows:

```
prompt="what is the min and max value of"+category_type+"?Provide the values in"+datatype+
    "format.Only print the values and print them in
    a list."
```

In this context, "category_type" refers to the category (e.g., a category of column) that the values are to be generated for. For instance, as a non-limiting example, suppose category_type is the weight of patients. In this context, the prompt asks generative AI model 104 to determine a minimum value and a maximum value of a patient's weight. By tailoring minimum and maximum values based on category types, synthetic data generator 112 improves the relevancy of data values in synthetic data. For instance, the minimum and maximum values for a patient's weight may be different than the minimum and maximum values for a patient's height or blood pressure.

As discussed herein, synthetic data generator 112 of FIGS. 1 and 2 may be configured to cause generative AI model 104 to generate various types of data parameters. For instance, synthetic data generator 112 may be configured to cause generative AI model 104 to generate a data parameter that specifies a range of values. For example, FIG. 5D shows an example code fragment 500D for generating a range of dates, in accordance with an example embodiment. Code fragment 500D defines a function 520 that utilizes generative AI model 104 to generate a range data parameter that specifies a first range subset (for selecting a "start" date from) and a second range subset (for selecting an "end" date from). Function 520 comprises a prompt block 522, a call block 524, a post-processing block 526, and a return statement 528. Function 520 accepts a generative AI model as an argument.

Prompt block 522 creates a prompt to be provided to generative AI model 104. In prompt block 522, a prompt is defined that tasks generative AI model 104 with generating three consecutive datetimes in a "month/day/year hours:minutes:seconds" format. Prompt block 522 includes similar prompt pre-processing as prompt block 504 of code fragment 502 of FIG. 5A.

Call block 524 includes a definition of the variable "chain" as an LLMChain function call to generative AI model 104 with the chat prompt of prompt block 522 and an output format as a comma separated list. Call block 524 also includes a call that executes the LLMChain function and passes a month and a year as arguments. This causes the month and year (January 2023 in FIG. 5D) to be passed into the human prompt of the chat prompt created in prompt block 522, which causes generative AI model 104 to generate three consecutive datetimes in January 2023. Post-processing block 526 converts the datetimes output by generative AI model 104 into a format that SDGT 106 expects (e.g., three formatted datetimes in a list). Return statement 528 provides the list of the datetimes as output.

Code fragment 500D is described with respect to generating a range date parameter based on a month and date provided as arguments in call block 524. However, it is also contemplated herein that the prompt in prompt block 522 may be modified to generate range date parameters based on other time and/or date information as well (e.g., based on a particular day, a range of days, a year, a range of years, a range of hours, a time of day). Furthermore, while the format of the datetimes in code fragment 500D include the month, day, year, hour, minute, and seconds of the datetime, embodiments described herein may use datetimes with less or more information (e.g., only dates, only time, without the year, without seconds, etc.). Moreover, while code fragment 500D is described with respect to generating a range data parameter for a range of dates, embodiments described herein are not so limited. For instance, synthetic data generator 112 may include logic that generates a range data parameter for any type of numeric range. In this context, an argument can be passed to an SDGT to generate synthetic data comprising a beginning value for a range (e.g., a start value or a minimum value) and an ending value for a range (e.g., an end value or a maximum value).

As discussed herein, synthetic data generator 112 of FIGS. 1 and 2 may be configured to cause generative AI model 104 to generate various types of data parameters. For instance, synthetic data generator 112 may be configured to cause generative AI model 104 to generate a data parameter that specifies a range of values. For example, FIG. 5E shows an example code fragment 500E for generating a categorical list of elements, in accordance with an embodiment. Code fragment 500E defines a function 530 that utilizes generative AI model 104 to generate the categorical list of elements for a particular category. Function 530 comprises a prompt block 532 and a call block 534. Function 530 accepts the generative AI model, a number of requested elements, a category type, and a maximum length of a word as arguments.

Prompt block 532 creates a prompt to be provided to generative AI model 104. In prompt block 532, a prompt is defined that tasks generative AI model 104 with generating a categorical list of elements. The prompt specifies the number of elements to be generated for a category based on the number in the argument of function 530 (e.g., the number assigned to the "num_cat" variable) and the maximum length (in characters) for the word specified in the argument of function 530 (e.g., the number assigned to the "max_length" variable). In accordance with an embodiment, the variables num_cat and max_length are specified in schema information provided to synthetic data generator 112. In this context, num_cat and/or max_length may be assigned to the specific category or in general (e.g., to all categories). Alternatively, the variables num_cat and/or max_length are assigned to a category by generative AI model 104 (e.g., in cases where generative AI model 104 generates categories for columns of data). In another alternative, synthetic data generator 112 comprises logic to determine a number of elements to be generated for a category and/or the maximum length of an element. Prompt block 532 comprises similar prompt pre-processing as prompt blocks 504 of FIG. 5A and prompt block 522 of FIG. 5D.

Call block 534 includes a definition of the variable "chain" as an LLMChain function call to generative AI model 104 with the chat prompt of prompt block 532 and an output format as a comma separated list. Call block 534 also includes a call that executes the LLMChain function and passes a category type as an argument. This causes the category type in the argument of function 530 ("random topic" in FIG. 5E) to be passed into the human prompt of the chat prompt created in prompt block 532, which causes generative AI model 104 to generate a categorical list of two elements in a random topic category.

In some embodiments, post-processing steps may be performed to refine the categorical list generated by executing function 530 of FIG. 5E. Synthetic data generator 112 may be configured to refine the categorical list in various ways. For example, FIG. 5F shows an example code fragment 500F for calling a function to post-process categorical data parameters generated by executing the code fragment of FIG. 5E, in accordance with an example embodiment. Code fragment 500F defines a function 536 that calls function 530 of FIG. 5E and performs post processing steps to generate a refined categorical list of elements. Function 536 comprises a call block 538, a post-processing block 540, and a test block 542. Function 536 accepts the generative AI model, a number of requested elements, a category type, and a maximum length of a word as arguments.

Call block 538 includes a function call to function 530 of code fragment 500E, as described with respect to FIG. 5E and passes the generative AI model, the number of requested categories, the category type, and the maximum length as arguments. In FIG. 5F, the number of requested categories passed to function 530 includes a buffer. This buffer is beneficial in situations where generative AI model 104 (e.g., erroneously) generates a value with an empty string. The output of function 530 is assigned to the variable "word_options".

Post-processing block 540 checks for empty strings in word_options and adds non-empty strings to a final list assigned to a "my_word_list" variable. Words are added to the my_word_list variable until there are no more words in the word_options variable or the total number of words added to the my_word_list variable is equal to the number of elements to be generated ("num_cat" in code fragment 5F.

Test block 542 performs a double check for empty strings in case the buffer was insufficient and returns the list stored in the my_word_list variable. In test block 542, if there are empty strings in my_word_list, an "add_words( )" function is called, passing my_word_list, the generative AI model, the number of empty strings, the category type, and the maximum length of an element as arguments. The add_words( ) function invokes another execution of function 530 and appends the output to the my_word_list variable. After test block 542 updates my_word_list variable, another check is made to see if any of the strings are empty. If not, the loop while loop is broken and the return statement returns the my_word_list variable. Otherwise, the loop repeats and the add_words( ) function is called again.

As discussed herein, synthetic data generator 112 of FIGS. 1 and 2 may be configured to cause generative AI model 104 to generate various types of data parameters. For instance, synthetic data generator 112 may be configured to cause generative AI model 104 to generate a data parameter that specifies a range of values. For example, FIG. 5G shows an example code fragment 500G for generating columns with dependencies, in accordance with an example embodiment. Code fragment 500G defines a function 544 that utilizes generative AI model 104 to generate two columns of data wherein the second column is dependent on the first column. Function 544 comprises a prompt block 546, a call block 548, and a post-processing block 550. Function 544 accepts the generative AI model, a number of requested element pairs, keywords, and a maximum length of a word as arguments.

Prompt block 546 creates a prompt to be provided to generative AI model 104. In prompt block 5323, a prompt is defined that tasks generative AI model 104 with generating pairs of words based on instructions received in an API call. The prompt specifies a maximum length (in characters) for the words specified in the argument of function 544 (e.g., the number assigned to the "max_length" variable). Max_length may be specified in schema information provided to synthetic data generator 112, assigned by synthetic data generator 112, and/or assigned by generative AI model 104 (e.g., in the generation of a category). Prompt block 546 comprises similar prompt pre-processing as prompt blocks 504 of FIG. 5A, prompt block 522 of FIG. 5D, and prompt block 532 of FIG. 5E.

Call block 548 includes a definition of the variable "chain" as an LLMChain function call to generative AI model 104 with the chat prompt of prompt block 546 and an output format as a comma separated list. Call block 534 also includes a definition for the variable "info" as a string including the number of requested element pairs and keywords passed as arguments of function 544. Furthermore, call block 534 includes a call that executes the LLMChain function and passes a the variable info as an argument. This causes the number of requested element pairs and keywords in the argument of function 544 to be passed into the human prompt of the chat prompt created in prompt block 546, which causes generative AI model 104 to generate pairs of values as pairs in a tuple. For instance, suppose the number of element pairs requested was twenty and the keywords were diseases and symptoms. In this context, execution of "chain.run (info)" causes generative AI model 104 to generate twenty pairs of diseases and corresponding symptoms.

Post-processing block 550 processes the output of call block 548 and splits it into two separate lists. In particular, the function "clean_two_columns( )" cleans the output (e.g., removing punctuation, performing other cleaning post-processing functions, etc.) and the function "convert_two_columns( )" splits the list of values generated by AI model 104 into two columns of data. In this context, each two proceeding words in the list are a pair that depends on each other, wherein execution of the function convert_two_columns( ) returns a list of pairs of values in two separate lists that are used as a dictionary, where values of the first column are keys to value pairs in the second column. For instance, with reference to FIG. 5G, suppose "cleaned_text" includes the list twenty diseases each proceed by a respective symptom. In this context, the function convert_two_columns( ) with "cleaned_text" passed as an argument (as shown in FIG. 5G) returns a first column of twenty diseases and a second column of twenty symptoms, where each disease is a key to a corresponding symptom value pair. In post-processing block 550, the first list is assigned to variable "col_1", the second list is assigned to variable "col_2", and the value_pair mapping is assigned to variable "value_pairs". In this manner, a particular a particular symptom can be returned by the following expression:

```
value_pairs[requestedkey]
```

where requestedkey is the disease (e.g., the "key" of the value_pairs dictionary). For instance, if a disease "Disease A" was mapped to a symptom "Symptom A", executing the expression value_pairs[Disease A] would return "Symptom A". A further example implementing such a dictionary is described with respect to FIG. 6D.

While code fragment 500G of FIG. 5G has been described with respect to generating two columns that are dependent upon each other, embodiments described herein are not so limited. For instance, embodiments of synthetic data generators may be configured to prompt a generative AI model to generate more than two categorical lists that are dependent upon each other.

Thus, example code fragments for generating categories and data parameters have been described with respect to synthetic data generator 112 of FIGS. 1 and 2 and code fragments 500A-500G of FIGS. 5A-5G. As described elsewhere herein, synthetic data generator 112 provides arguments comprising the data parameters generated utilizing generative AI model 104 to SDGT 106 to generate synthetic data. In accordance with an embodiment, synthetic data generator 112 comprises logic (e.g., code) that, when executed, transmits API calls to SDGT 106 to generate scaled data. To better understand the operation of synthetic data generator 112 interfacing with SDGT 106 to generate scaled data, synthetic data generator 112 of FIG. 2 is described with respect to FIGS. 6A-6D. FIGS. 6A-6D illustrate respective code fragments for utilizing a SDGT. FIGS. 6A-6D are described with respect to a running example in a health domain; however, implementations of synthetic data generator 112, generative AI model 104, and SDGT 106 are not limited to such a domain. Further structural and operational embodiments will be apparent to persons skilled in the relevant art(s) based on the following descriptions of FIGS. 6A-6D with respect to FIGS. 2 and 5A-5G.

As discussed with respect to FIGS. 5B and 5C, synthetic data generator 112 may cause generative AI model 104 to generate a numeric data parameter that specifies a range of values (e.g., numeric values). In embodiments, synthetic data generator 112 may be configured to provide an argument to SDGT 106 that includes such a data parameter to cause SDGT 106 to generate a column of synthetic values that are within the range of values. For example, FIG. 6A shows an example code fragment 600A for utilizing a SDGT to generate a column of numeric data, in accordance with an example embodiment. Code fragment 600A defines a function 602 that utilizes SDGT 106 to generate a column of numeric data based on a data parameter generated by generative AI model 104. Function 602 comprises an initialization block 604 and a call block 606. Function 602 accepts a number of rows to generate and a numeric data parameter as arguments.

Initialization block 604 initializes the variable "sdgt" as the function call to SDGT 106, initializes the "values" variable as an empty array, sets the value of the "min_val" variable to the first value of the numeric data parameter passed to function 602 as an argument thereof (e.g., "−2147483648" in FIG. 6A), and sets the value of the "max_val" variable to the second value of the numeric data parameter passed to function 602 as an argument thereof (e.g., "2147483647" in FIG. 6A).

Call block 606 generates a random set of numbers between the minimum and maximum values of the numeric data parameter utilizing SDGT 106. For instance, for the number of rows of data to be generated (e.g., 50 in FIG. 6A), a call is made to SDGT 106 using the sdgt.random_int( ) function to generate a random integer between the minimum and maximum values of the numeric data parameter. Each number is appended to the values array. Once the values have been generated for each row, the values array is returned. In accordance with an embodiment, synthetic data generator 112 comprises additional logic to check if a number has been used (or has been used more than a predetermined number of times) before adding it to the values array. This checking logic would prevent repetitive data in synthetic data generated by synthetic data generator 112.

Thus code fragment 600A has been described with respect to generating a column of numeric data based on a data parameter. The example shown in FIG. 6A shows generating a column of integers. However, it is also contemplated herein that synthetic data generator 112 may be used to generate columns of decimal data (e.g., floats). In this context, a similar function to function 602 is utilized to generate a column of floats based on a numeric data parameter generated using generative AI model 104.

As discussed with respect to FIG. 5D, synthetic data generator 112 may cause generative AI model 104 to generate a range data parameter that specifies a first range subset and a second range subset. In embodiments, synthetic data generator 112 may be configured to provide an argument to SDGT 106 that includes such a range data parameter to cause SDGT 106 to generate two columns of synthetic values that include start values and end values. For example, FIG. 6B shows an example code fragment 600B for utilizing a SDGT to generate columns with a range of dates, in accordance with an example embodiment. Code fragment 600B defines a function 608 that utilizes SDGT 106 to generate the columns of a range of dates based on a range data parameter generated by generative AI model 104. Function 608 comprises a parameter generation block 612, argument blocks 614 and 616, and a return statement 618. Function 608 accepts a generative AI model and a number of rows to generate as arguments.

Parameter generation block 612 generates range data parameters for SDGT 106. As shown in FIG. 6B, parameter generation block 612 includes a call to function 520 of code fragment 500D, as described with respect to FIG. 5D. Parameter generation block 612 includes a check to verify the datetimes generated by function 520 are in the correct format. If not, function 520 is called again until datetimes in the correct format are generated.

Argument block 614 is configured to generate the "start" datetime for a range of dates and argument block 616 is configured to generate the "end" datetime for the range. For each row to be generated (50 in FIG. 6B), argument block 614 calls a function sdgt.date_time_between( ) of SDGT 106, passing the first and second dates in the range data parameter as arguments. The values generated by SDGT 106 are appended to a "start_dts" array. For each row to be generated, argument block 616 calls the function sdgt.date_time_between( ) of SDGT 106, passing the second and third dates in the range data parameter as arguments. The values generated by SDGT 106 are appended to a "end_dts" array. Return statement 618 returns two columns, one comprising the values in the start_dts array and the other comprising values in the end_dts array.

While code fragment 600B is described with respect to generating two columns with dependent start and end dates, embodiments described herein are not so limited. For instance, synthetic data generator 112 may include logic that utilizes SDGT 106 to generate a range dependent numeric data values of any type. In this context, an argument can be passed to SDGT 106 to generate synthetic data comprising a beginning value for a range (e.g., a start value or a minimum value) and an ending value for a range (e.g., an end value or a maximum value).

As discussed with respect to FIGS. 5E and 5F, synthetic data generator 112 may cause generative AI model 104 to generate a categorical data parameter that specifies a categorical list of elements. In embodiments, synthetic data generator 112 may be configured to provide an argument to SDGT 106 that includes such a categorical data parameter to cause SDGT 106 to generate a column of synthetic values based on the categorical list. For example, FIG. 6C shows an example code fragment 600C for utilizing a SDGT to generate a column of categorical data, in accordance with an example embodiment. Code fragment 600C defines a function 620 that utilizes SDGT 106 to generate a column of synthetic data values based on a categorical data parameter generated by generative AI model 104. Function 620 comprises a parameter generation call 622, a check block 624, and an argument block 626. Function 620 accepts the generative AI model, a number of requested elements, a maximum length of a word, a category type, and a number of rows as arguments.

Parameter generation call 622 generates a categorical data parameter for SDGT 106. As shown in FIG. 6C, parameter generation call 622 calls function 536 of code fragment 500F, as described with respect to FIG. 5F.

Check block 624 is configured to check if the categorical list of elements generated by generative AI model 104 has been used in another table. As shown in FIG. 6C, check block 624 comprises an index 628, an if code block 630, an else code block 632, and an else code block 634. Check block 624 is used to increase the variance in elements across different tables in a dataset. For example, suppose synthetic data generator 112 is utilized to generate multiple tables for a single dataset. Check block 624 ensures that the same list of elements is not used in more than a predetermined number of tables in the dataset (e.g., 3 in the example shown in FIG. 6C). This predetermined number may be specified in schema information for a particular user or organization. Alternatively, synthetic data generator 112 is pre-configured to limit the number of tables in a dataset that use the same list of elements to generate columns of synthetic data values. Index 628 is used to check how many times the list of elements ("my_word_list" in FIG. 6C) appears in all lists of elements used to generate tables for a dataset ("cat_groupings" in FIG. 6C). If the list has been used the predetermined number of times, synthetic data generator 112 provides a call to generative AI model 104 to generate a new list (e.g., as shown in if code block 630). Otherwise, as shown in else code block 632, the number of times the list of elements appears in the cat_groupings is incremented by 1. As shown in else code block 634, if this is the first table in the dataset to utilize the list of elements, the list is appended to cat_groupings and the count is initialized at 1.

Argument block 626 is configured to place a function call to SDGT 106 and return the column of synthetic data values. As shown in FIG. 6C, argument block 626 includes a call to a sdgt.sentence( ) function that selects one word from the categorical list of elements generated from the parameter generation call 622. The selected word is appended to a values array and the process is repeated for the number of rows requested (e.g., 50 in code fragment 600C). The return statement in argument block 626 returns the values array as a column of synthetic data values.

As discussed with respect to FIGS. 5G, synthetic data generator 112 may cause generative AI model 104 to generate categorical lists that are dependent on each other. In embodiments, synthetic data generator 112 may be configured to provide an argument to SDGT 106 that includes such the categorical lists to cause SDGT 106 to generate two columns of synthetic values wherein a value in the second column is dependent on the value in the first column. For example, FIG. 6D shows an example code fragment 600D for utilizing a SDGT to generate two columns of data based on pairs of words, in accordance with an example embodiment. Code fragment 600D defines a function 636 that utilizes SDGT 106 to generate two columns of data based on a data parameter generated by generative AI model 104 that specifies pairs of words. Function 636 comprises a parameter generation call 640, a column generation block 642, and a return statement 644. Function 636 accepts the generative AI model, a number of categories, a maximum word length, keywords, and a number of rows to generate as arguments.

Parameter generation call 640 generates two categorical lists that are dependent on one another. As shown in FIG. 6D, parameter generation call 640 calls function 544 of code fragment 500G, as described with respect to FIG. 5G.

Column generation block 642 is configured to generate the columns of dependent data. As shown in FIG. 6D, column generation block 624 comprises a while loop 646, a function call 648, and pair look-up 650. While loop 646 includes a safety check so that if a key in a dictionary is not found, the code continues to run. Function call 648 places a call to function sdgt.sentence( ) of SDGT 106 to cause SDGT 106 to select an element from the first list generated by generative AI model 104 in response to parameter generation call 640. Once the first element is selected, pair look-up 650 utilizes the mappings of keys to value pairs in the output of parameter generation call 640 to look up the element in the second list that dependents on the element selected from the first list. The first selected element is appended to a first column, "values_col_1", and the second selected element is appended to a second column, "values_col_2". The process is repeated for the requested number of rows (e.g., 50 rows in FIG. 6D). Return statement 644 returns the two columns of scaled data.

Thus, example code fragments for generating columns of scaled data have been described with respect to SDGT 106 and synthetic data generator 112 of FIGS. 1 and 2 and code fragments 600A-600D of FIGS. 6A-6D. In embodiments, synthetic data generator 112 comprises logic that appends columns of scaled data to generate a table of synthetic data. For instance, synthetic data handler 222 of FIG. 2 is configured to append columns generated by SDGT 106 to generate synthetic data in a table or dataset form.

III. Embodiments for Synthetic Sentence Data Generation

Figure 7:
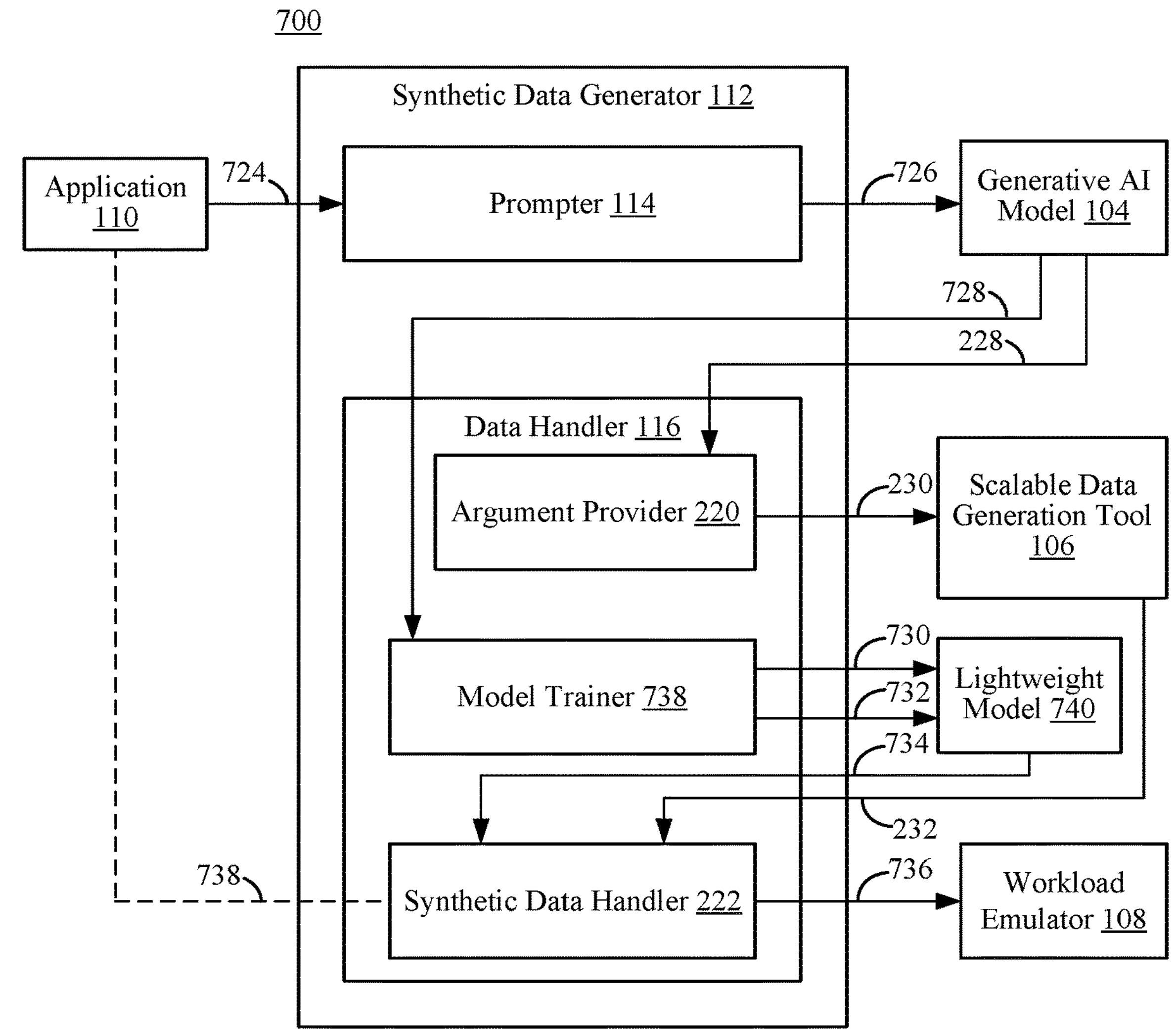
FIG. 7 shows an example block diagram of a system for generating synthetic data comprising synthetic sentence data, in accordance with an example embodiment.

As described elsewhere herein, in some implementations, a user or an organization may require synthetic data that includes coherent sentences, such as simulating a doctor's recommendation to a patient or comments the patient made to the doctor. Embodiments of the present disclosure may be configured to generate "synthetic sentence data" that simulates sentences that would appear in a real dataset. Systems, devices, and apparatuses described herein may perform in various ways to generate synthetic sentence data. For instance, FIG. 7 shows an example block diagram of a system 700 for generating synthetic data comprising synthetic sentence data, in accordance with an example embodiment. As shown in FIG. 7, system 700 comprises generative AI model 104, scalable data generation tool 106, workload emulator 108, application 110, and synthetic data generator 112 (comprising prompter 114 and data handler 116) as described with respect to FIG. 1, as well as a lightweight model 740. As also shown in FIG. 7, data handler 116 comprises argument provider 220 and synthetic data handler 222 as described with respect to FIG. 2, as well as a model trainer 738. Lightweight model 740 is a machine learning model configured to generate coherent sentences based on training data. In accordance with an embodiment, lightweight model 740 is a statistical model that determines a future state (e.g., the next word in a sequence) based on the current state. For instance, lightweight model 740 in accordance with an embodiment is a Markov chain model.

Figure 8:
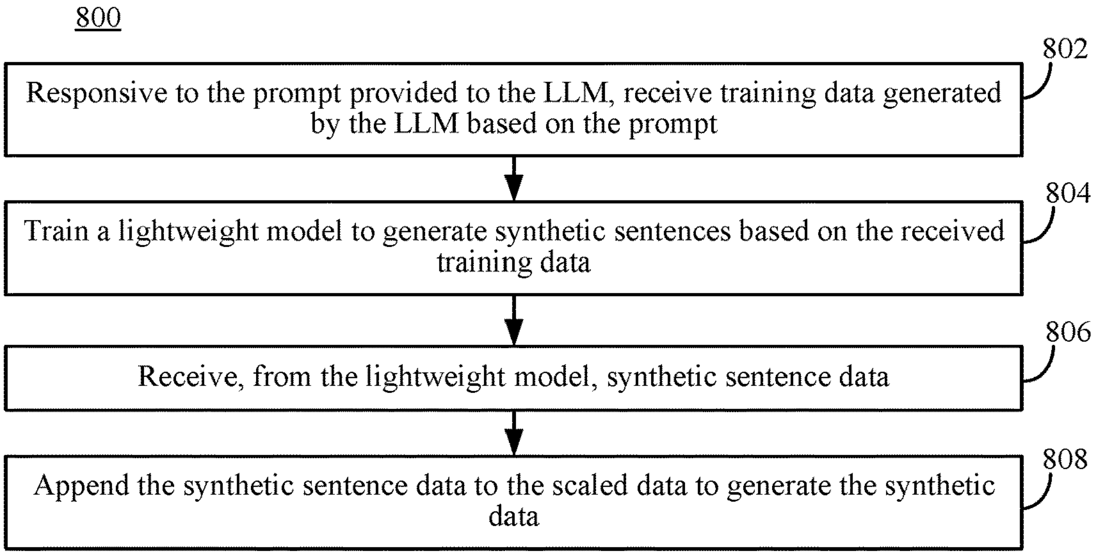
FIG. 8 shows an example flowchart of a process for generating synthetic data comprising synthetic sentence data, in accordance with an example embodiment.

To better illustrate embodiments for generating synthetic data comprising synthetic sentence data, FIG. 7 is described with respect to FIG. 8. FIG. 8 shows an example flowchart 800 of a process for generating synthetic data comprising synthetic sentence data, in accordance with an example embodiment. Synthetic data generator 112 may operate according to flowchart 800 in embodiments. Not all steps of flowchart 800 need be performed in all embodiments. Further structural and operational embodiments will be apparent to persons skilled in the relevant art(s) based on the following descriptions of FIGS. 7 and 8.

Flowchart 800 begins with step 802. In step 802, training data generated by the LLM based on the prompt is received responsive to the prompt provided to the LLM. For example, as shown in FIG. 7, model trainer 738 receives training data 728 generated by generative AI model 104 based on prompt 726. Prompt 726 specifies a domain and instructions to generate synthetic sentence data associated with the domain. In accordance with an embodiment, and as shown in FIG. 7, prompter 114 generates prompt 726 responsive to schema information 724 received from application 110. In this context, schema information 724 specifies a column of synthetic data should include synthetic sentence data. Alternatively, prompter 114 determines a category for a column of synthetic data generated for a domain specified in schema information 724 should include synthetic sentence data. For instance, prompter 114 may cause generative AI model 104 to generate a list of categories for respective columns in a dataset (e.g., in a manner similar to that described with respect to code fragment 500A of FIG. 5A) wherein at least one of the categories for a respective column relates to data that includes synthetic sentence data. As a non-limiting example, suppose schema information 724 specifies a healthcare domain and a category for a column of data is "doctor's comments to patients." In this example, prompt 726 prompts generative AI model 104 to generate training data 728 by generating example comments a doctor may provide to a patient during an exam. In accordance with an embodiment, training data 728 includes a list or dictionary of example synthetic sentences suitable for training lightweight model 740. While FIG. 7 illustrates training data 728 as a separate response from response 228 (which comprises data parameters generated in response to prompt 726), it is also contemplated herein that training data 728 and data parameters are included in the same response. In this context, data handler 116 (or a component thereof) provides the included training data to model trainer 738 for training lightweight model 740.

In step 804, a lightweight model is trained to generate synthetic sentences based on the received training data. For example, model trainer 738 of FIG. 7 trains lightweight model 740 based on training data 728 received from generative AI model 104. In FIG. 7, model trainer 738 provides training instructions 730 (comprising training data 728) to lightweight model 740. In accordance with an embodiment wherein training data 728 comprises examples of synthetic sentence data, training instructions 730 cause lightweight model 740 to determine a set of probabilities of a word appearing after another word in a sentence. In accordance with an embodiment, training instructions 730 cause lightweight model 740 to determine words that signify the beginning or end of a sentence.

In step 806, synthetic sentence data is received from the lightweight model. For example, model trainer 738 of FIG. 7 provides generation instructions 732 to a trained version of lightweight model 740 that cause the trained lightweight model 740 to generate synthetic sentence data based on generation instructions 732. As also shown in FIG. 7, synthetic data handler 222 receives a response 734 from lightweight model 740 comprising the generated synthetic sentence data. In accordance with an embodiment, generation instructions 732 specify a number of sentences to generate in the synthetic sentence data.

In step 808, the synthetic sentence data is appended to the scaled data to generate the synthetic data. For example, synthetic data handler 222 of FIG. 7 appends synthetic sentence data included in response 734 to scaled data 232 to generate synthetic data. Scaled data 232 is generated in a manner similar to that described with respect to FIGS. 2 and 3 (e.g., prompt 726 causes generative AI model 104 to generate a response 228 comprising data parameter(s), argument provider 220 provides an argument comprising the data parameter(s) to SDGT 106 to generate scaled data 232, and synthetic data handler 222 receives scaled data 232 from SDGT 106).

Subsequent to step 808, synthetic data generated by synthetic data handler 222 appending synthetic sentence data to scaled data 232 may be utilized in various ways. For instance, the synthetic data may be provided in a workload call 736 to workload emulator 108 to cause workload emulator 108 to emulate a workload utilizing the synthetic data comprising scaled data 232 and the appended synthetic sentence data (e.g., to generate a performance benchmark for the domain included in prompt 726). Alternatively, or additionally, the synthetic data is provided to application 110 via transmission 238 for further analysis, review, and/or display in a GUI of application 110 (not shown in FIG. 7). Furthermore, in another example embodiment, synthetic data handler 222 provides the synthetic data to a data analytics engine (not shown in FIG. 7) to expand the synthetic data into a larger dataset. In this context, the data analytics engine may copy (e.g., duplicate) synthetic sentences of the synthetic sentence data across expanded rows and/or randomize copied synthetic sentences. Alternatively, the data analytics engine includes additional logic to generate new synthetic sentences (e.g., utilizing a built-in sentence generator or by providing instructions to lightweight model 740 to generate additional synthetic sentences).

Synthetic data generator 112 is described with respect to FIGS. 7 and 8 as utilizing a lightweight model (e.g., lightweight model 740) to generate synthetic sentence data. In accordance with an embodiment, synthetic data generator 112 comprises logic that, when executed, transmits API calls to (and/or executes functions of) lightweight model 740 to generate synthetic sentence data. To better understand the operation of synthetic data generator 112 interfacing with lightweight model 740 to go generate synthetic sentence data, synthetic data generator 112 of FIG. 7 is described with respect to FIGS. 9A-9D. FIGS. 9A-9D illustrate respective code fragments related to training of and use of lightweight model 740. FIGS. 9A-9D are described with respect to a running example in a health domain; however, implementations of synthetic data generator 112, generative AI model 104, and lightweight model 740 are not limited to such a domain. Further structural and operational embodiments will be apparent to persons skilled in the relevant art(s) based on the following descriptions of FIGS. 9A-9D with respect to FIG. 7.

Depending on the implementation, synthetic data generator 112 may utilize generative AI model 104 to generate training data for lightweight model 740 (e.g., training data 728) in various ways. For example, FIG. 9A shows an example code fragment 900A for generating training data for a lightweight model, in accordance with an example embodiment. Code fragment 900A defines a function 902 that utilizes generative AI model 104 to generate training data for lightweight model 740. Function 902 comprises an open statement 904, a data generation block 906, and a close statement 910. Function 902 accepts the generative AI model, a file path, a domain ("company_type" in FIG. 9A), and a total number of values of training data to generate (100 in FIG. 9A).

Open statement 904 sets a target file path for the training data. In open statement 904 an "open( )" function is called with "file_path" and "w" as arguments. "file_path" is the path and name of the file the training data is to be saved to passed in function 902. "w" indicates the file is to be opened for writing. If the file does not exist in the file path, the open( ) function creates the file.

Data generation block 906 comprises logic for generating training data 728. Data generation block 906 comprises prompt block 912, call block 914, and post-processing block 916. In prompt block 912, a prompt template is defined for prompting generative AI model 104 to generate comments a person in a particular subject would tell a user. In prompt 912, a subject is passed to the prompt via "{subject}". Alternatively, embodiments of code fragment 900A comprise prompt pre-processing similar to that shown in prompt block 502 of code fragment 500A as described with respect to FIG. 5A.

In call block 914, a call is placed to generative AI model 104 utilizing the llm_chain.predict( ) function and passing the argument "subject=company_type". In this context, the domain passed to function 902 is passed to 11*m*_chain.predict( ), which inserts the domain into the prompt of prompt block 912 and transmits the prompt to generative AI model 104. Post-processing block 916 includes logic that cleans punctuation in a response received from generative AI model 104 and writes the output to the opened file.

As shown in code fragment 900A, the operation of data generation block 906 is repeated for each number of example sentences to generate. In this context, a separate call is made to generative AI model 104 for each sentence generated for training data 728. Alternatively, the prompt in prompt block 912 prompts generative AI model 104 to generate the requested number of separate comments and return them in a list. In this context, the list is written to the open file. By prompting generative AI model 104 to generate multiple comments at once, the number of calls made to generative AI model 104 is reduced.

In close statement 910, the file opened in open statement 904 is closed and the generation of training data 728 is complete. In this context, training data 728 is saved in the file path. The file path may be a location in memory of computing device 102 or an external data store (e.g., storage 126 of FIG. 1).

Code fragment 900A is described with respect to generating training data a person (e.g., a professional, an employee, etc.) in a domain would tell a user (e.g., a customer). However, training data may be generated for generating other types of sentence data (e.g., sentences a user would tell a person, sentences one person would tell another person, sentences a user would tell another user, and/or the like). In this context, prompt block 912 of code fragment 900A would be modified to include a template for generating such a sentence. In accordance with another embodiment, code fragment 900A comprises logic for selection one of several types of prompts to generate (e.g., a first prompt similar to the prompt shown in prompt block 912, a second prompt for a sentence a user would tell a person, a third prompt for a sentence a person would tell another person, a fourth prompt for a sentence a user would tell another user, etc.). In this context, function 902 is modified to accept an argument that indicates which of the prompts to be generated. Alternatively, 902 is configured to generate training data for each of the prompts. In this alternative embodiment, training data for each prompt is saved as separate sets of training data.

Embodiments of synthetic data generator 112 may be configured to train lightweight model 740 in various ways. For example, FIG. 9B shows an example code fragment 900B for training a lightweight model, in accordance with an example embodiment. Code fragment 900B defines a function 918 that trains lightweight model 740 utilizing training data 728. Function 918 comprises an open block 920, a training block 922, and a return statement 924. Function 918 accepts the file path training data 728 is stored in as an argument.

In open block 920, the file stored in the file path training data is saved to is opened and the data is read. In training block 922 a markovify.Text( ) function is called to train lightweight model 740 based on training data 728. In the example shown in FIG. 9B, lightweight model 740 is a Markov chain model and the markovify.Text( ) is a function used for generating Markov chain models. In this context, the markovify.Text( ) function attempts to generate sentences that are not duplicates of the text passed through as an argument (e.g., training data 728). Alternatively, markovify.Text( ) is modified to allow duplicates of sentences passed through as an argument. In accordance with an embodiment an additional argument may be passed to markovify.Text( ) to determine the number of words the probability of the next word depends on. Alternatively, a default number is used. Return statement 924 returns the trained lightweight model 740.

Synthetic data generator 112 may be configured to generate synthetic sentence data utilizing lightweight model 740 in various ways, in embodiments. For example, FIG. 9C shows an example code fragment 900C for generating synthetic sentence data utilizing a lightweight model, in accordance with an example embodiment. Code fragment 900C defines a function 926 that utilizes a trained version of lightweight model 740 to generate synthetic sentence data. Function 926 comprises a column initialization statement 928, a generation block 930, and a return statement 932. Function 926 accepts the trained lightweight model (e.g., the model returned by function 918 of code fragment 900B of FIG. 9B), the total comments to be generated ("1" in FIG. 9C), and the maximum length of a sentence (e.g., 100 characters in FIG. 9C).

Column initialization statement 928 initializes a column ("comments") that synthetic sentences generated by lightweight model 740 are stored in. Generation block 930 comprises logic for generating comments utilizing lightweight model 740. As shown in FIG. 9C, generation block 930 comprises a comment length statement 934, a sentence generation statement 936, a check loop 938, and an append statement 940. Comment length statement 934 randomly sets a maximum length for a sentence generated using lightweight model 740 between a predetermined number of characters ("50" in FIG. 9C) and the maximum character length passed through function 926 (the "char_length" variable). Alternatively, the first predetermined number of characters is passed through function 926 as an additional argument. In another alternative embodiment, the maximum character length is not passed through function 926 and a default maximum character length is used. In another alternative embodiment, generation block 930 does not include a comment length statement 934 and the maximum length for any comment generated using lightweight model 740 is determined based on the maximum character length passed through function 926 (or a default maximum character length).

In sentence generation statement 936, a call is made to lightweight model 740 utilizing the markov_model.make_short_sentence( ) function passing the character length defined in comment length statement 934 (or alternatively the maximum character length passed through function 926 or a default maximum character length). The function markov_model.make_short_sentence( ) causes lightweight model 740 to generate a sentence no longer than the passed character length. Check loop 938 verifies lightweight model 740 returned a sentence and, if not, places another call to lightweight model 740. Append statement appends the generated sentence to the column initialized in column initialization statement 928. The operation of generation block 930 is repeated until the number of comments generated is equal to the number passed through function 926. Return statement 932 returns the column of comments.

In accordance with an embodiment, synthetic data generator 112 is configured to check if a lightweight model has already been trained or if training data for a lightweight model has already been generated for a domain. Synthetic data generator 112 may be configured to check for existing trained lightweight models and/or training data in various ways, in embodiments. For example, FIG. 9D shows an example code fragment 900D for generating synthetic sentence data utilizing a lightweight model, in accordance with an example embodiment. Code fragment 900D defines a function 942 that checks for training data and trained lightweight models, causes the generation of non-pre-generated training data, causes the training of untrained lightweight models, and causes the generation of comments utilizing a trained lightweight model. As shown in FIG. 9D, function 942 comprises a file path definition block 944, a training data check block 946, a model check block 948, and a comment generation block 950. Function 942 accepts the generative AI model, the domain ("company_type"), the number of synthetic sentences to generate ("num_rows"), and the maximum length of a comment ("comment_len") as arguments.

File path definition block 944 defines file paths that existing training data and trained models may be saved to and where new training data and trained models are to be saved to. For instance, "lakehouse_root_path" is a variable that defines the root file path for saved files, "data_file" defines a file name for training data, "file_path" defines a file path for data_file, "model_name" defines a file name for a trained model, and "modelpath" defines a file path for model_name. While file path definition block 944 illustrates a default root file path, in accordance with an embodiment, code fragment 900D includes logic for passing a root file path as an argument of function 942. Alternatively, synthetic data generator 112 determines a root file path (e.g., based on schema information received from application 110 and/or included in a schema file).

Training data check block 946 comprises logic for checking if training data has already been generated for a domain. The logic checks the file_path for an existing data_file. If data_file does not exist, a call is placed to function 902 of code fragment 900A of FIG. 9A to cause generative AI model 104 to generate training data (e.g., training data 728). Model check block 948 comprises logic for checking if a trained version of lightweight model 740 has already been generated. The logic checks the model_path for an existing model_name. If model_name does not exist, a call is placed to function 918 of code fragment 900B of FIG. 9B to cause lightweight model 740 to be trained to generate synthetic sentences.

Comment generation block 950 comprises logic for generating synthetic sentence data utilizing a trained version of lightweight model 740. The trained model is loaded from model_path. A call is made to function 926 of code fragment 900C of FIG. 9C that passes the trained version of lightweight model 740 ("mv_model"), the number of comments to generate ("num_rows"), and the maximum length of a comment ("comment_len") as arguments. The results are returned as a column "comments" (i.e., synthetic sentence data). In accordance with an embodiment, and as described with respect to step 808 of flowchart 800 of FIG. 8, synthetic data handler 222 comprises logic that appends the comments column to scaled data generated by SDGT 106.

As discussed herein, synthetic data generator 112 of FIGS. 1, 2, and 7 may be configured to utilize generative AI model, SDGT 106, and/or lightweight model 740 to generate synthetic data. Synthetic data may comprise one or more tables in a dataset. FIG. 10 shows a table 1000 of synthetic data, in accordance with an example embodiment. Table 1000 represents synthetic data generated for a health domain. Synthetic data generator 112 may operate to generate table 1000 in embodiments. Further structural and operational embodiments will be apparent to persons skilled in the relevant art(s) based on the following description of FIG. 10.

Table 1000 includes a plurality of columns with headings 1002 and synthetic data values 1004. In accordance with an embodiment headings 1002 are included in schema information provided to prompter 114 of synthetic data generator 112 (e.g., as schema information 224, schema information 224, a schema file, and/or the like). Alternatively, prompter 114 transmits a prompt to generative AI model 104 to generate headings 1002. For instance, in accordance with an embodiment, prompter 114 calls function 502 of code fragment 500A of FIG. 5A to generate headings 1002. As shown in FIG. 10, headings 1002 comprise column headings labeled "Patient #", "Check-In Time", "Check-Out Time", "New Patient?", "Reason for Visit", "Patient Heigh (in.)", "Patient Weight (lb.)", and "Doctor's Comments". Each of the columns of table 1000 are described as follows.

Synthetic data generator 112 utilizes generative AI model 104 and SDGT 106 to generate the first seven columns. The Patient #column represents a key for the rows in table 1000. Synthetic data generator 112 may be configured to utilize SDGT 106 and/or lightweight model 740 to generate any number of rows, as described elsewhere herein. The Check-In Time and Check-Out Time columns represent dependent start and end datetimes. In accordance with an embodiment, synthetic data generator 112 generates data parameters for these columns by calling function 520 of code fragment 500D of FIG. 5D and generates the synthetic data values in the columns by calling function 608 of code fragment 600B of FIG. 6B. The New Patient column represents binary yes or no data, which may be generated using categorical data parameters or a built-in function of SDGT 106, depending on the implementation. The Reason for Visit column comprises synthetic data values selected from a categorical list of elements. In accordance with an embodiment, synthetic data generator 112 generates the categorical list of elements by calling function 536 of code fragment 500F of FIG. 5F and generates the synthetic data values by calling function 620 of code fragment 600C of FIG. 6C. The Patient Height (in.) and Patient Weight (lb.) columns comprise synthetic data values selected from a numeric range. In accordance with an embodiment, synthetic data generator 112 generates the numeric range by calling function 510 of code fragments 500B and 500C of FIGS. 5B and 5C and generates the synthetic data values by calling function 636 of FIG. 6D.

Synthetic data generator 112 utilizes generative AI model 104 and lightweight model 740 to generate the Doctor's Comments column. In accordance with an embodiment, synthetic data generator 112 prompts generative AI model 104 to generate training data for what a doctor would say to a patient during an exam. For instance, synthetic data generator 112 may generate the training data by calling function 902 of code fragment 900A of FIG. 9A and passing the health domain as an argument. Synthetic data generator 112 trains lightweight model 740 to generate synthetic sentences based on training data generated by generative AI model 104 (e.g., by calling function 918 of code fragment 900B of FIG. 9B). Once lightweight model 740 is trained, synthetic data generator 112 calls a function (e.g., function 926 of code fragment 900C of FIG. 9C or function 942 of code fragment 900D of FIG. 9D) of the trained lightweight model to generate the synthetic sentence data values for the Doctor's Comments columns.

IV. Embodiments for Prompt Generation

Figure 11:
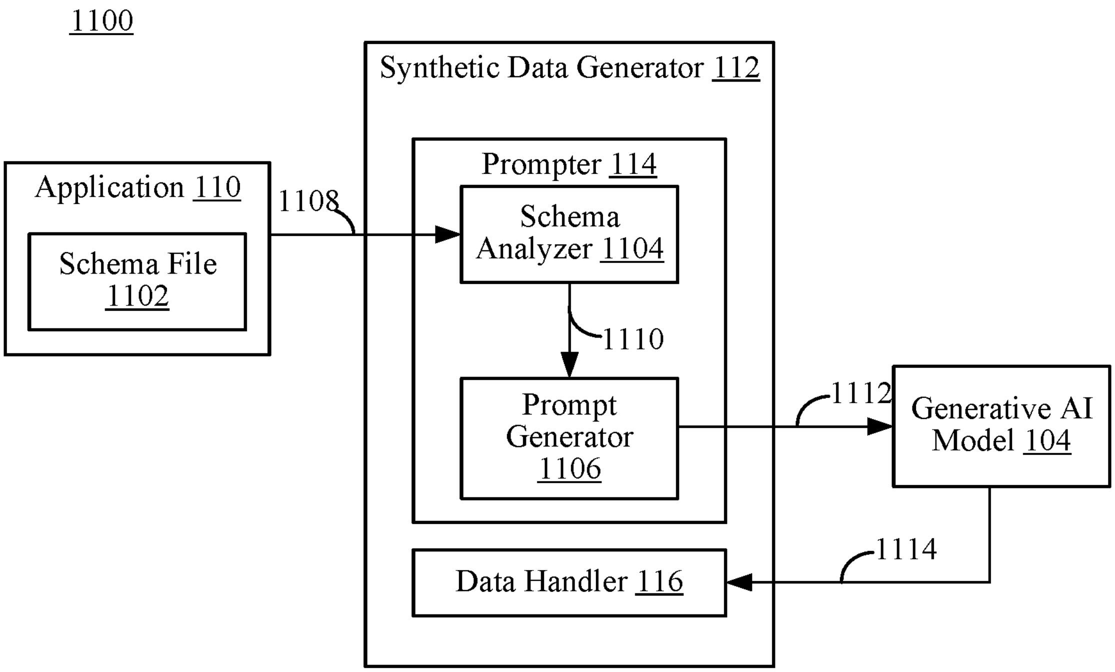
FIG. 11 shows a block diagram of a system for generating a prompt, in accordance with an example embodiment.
Figure 12:
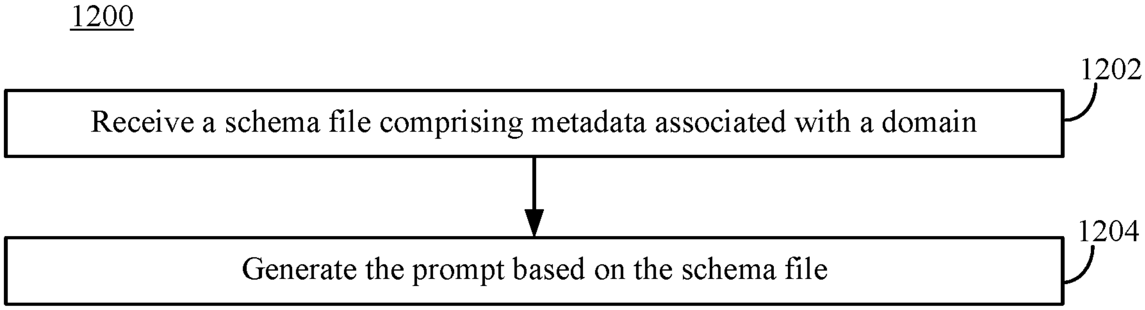
FIG. 12 shows a flowchart of a process for generating a prompt, in accordance with an example embodiment.

Prompts may be generated in various ways. For instance, a user may interact with a user interface of synthetic data generator 112 (e.g., via application 110 and/or computing device 102 of FIG. 1) to generate a prompt based on schema information. Alternatively, synthetic data generator 112 comprises logic for automatically generating prompts based on schema information. Synthetic data generator 112 may be configured to automatically generate prompts in various ways, in embodiments. For instance, FIG. 11 shows a block diagram of a system 1100 for generating a prompt, in accordance with an example embodiment. As shown in FIG. 11, system 1100 comprises application 110, synthetic data generator 112 (comprising prompter 114 and data handler 116), and generative AI model 104, as described with respect to FIG. 1. As also shown in FIG. 11, application 110 comprises a schema file 1102 and prompter 114 comprises a schema analyzer 1104 and a prompt generator 1106. Schema file 1102 comprises metadata associated with a user, an organization, and/or a domain. To better illustrate embodiments for generating a prompt, system 1100 is described with respect to FIG. 12. FIG. 12 shows a flowchart 1200 of a process for generating a prompt, in accordance with an example embodiment. Prompter 114 of FIG. 11 may operate according to flowchart 1200 in embodiments. Not all steps of flowchart 1200 need be performed in all embodiments. Further structural and operational embodiments will be apparent to persons skilled in the relevant art(s) based on the following descriptions of FIGS. 11 and 12.

Flowchart 1200 begins with step 1202. In step 1202, a schema file comprising metadata associated with a domain is received. For example, schema analyzer 1104 of FIG. 11 receives request 1108 comprising schema file 1102 from application 110. Schema file 1102 comprises metadata associated with a particular domain (e.g., a domain of a user, an organization, a customer, etc.). In accordance with an embodiment, schema analyzer 1104 analyzes the metadata included in schema file 1102 to identify the domain as well as any other information suitable for providing to generative AI model 104 to generate data parameters (e.g., lists of categories to use as headings in a dataset, types of synthetic sentences to generate, maximum size of a synthetic sentence, datatypes of categories, the number of columns to generate in a dataset, file paths to save data to, and/or the like) and/or for otherwise generating synthetic data (e.g., the number of rows to generate in synthetic data, data values to generate without data parameters generated by generative AI model 104, file paths to save models and/or data to, etc.). As shown in FIG. 11, schema analyzer 1104 provides analysis results 1110 to prompt generator 1106.

In step 1204, a prompt is generated based on the schema file. For example, prompt generator 1106 of FIG. 11 generates a prompt 1112 based on analysis results 1110 (generated by schema analyzer 1104 analyzing schema file 1102 included request 1108). Prompt generator 1106 in accordance with an embodiment generates separate prompts for data parameters for different columns of data in a table of synthetic data to be generated. Alternatively, prompt generator 1106 generates a prompt to generate data parameters for multiple columns at a time (e.g., dependent columns or multiple independent columns at once). Prompt generator 1106 in accordance with an embodiment generates a prompt by passing data identified in schema file 1104 (via analysis by schema analyzer 1104) as arguments to functions that provide prompts to generative AI model 104 (e.g., function 502 of FIG. 5A, function 510 of FIGS. 5B and 5C, function 520 of FIG. 5D, function 530 of FIG. 5E, function 536 of FIG. 5F, function 544 of FIG. 5E, and/or any other function suitable for providing a prompt to generative AI model 104 as described elsewhere herein and/or as would be understood by a person ordinarily skilled in the relevant art having benefit of the present disclosure. As described elsewhere herein and as shown in FIG. 11, generative AI model 104 provides a response 1114 comprising data parameters generated based on prompt 1112.

V. Example Generative Artificial Intelligence Model

As noted herein, the embodiments of the present disclosure utilize a generative artificial intelligence model to generate data parameters to be used as input for a scalable data generation tool in the generation of synthetic data for use in performance benchmarking. A generative AI model is a model that generates content that is complex, coherent, and/or original. For instance, a generative AI model can create sophisticated sentences, lists, ranges, tables of data, images, essays, and/or the like. Examples of generative AI models include, but are not limited to, language models (e.g., large language models (LLMs)), generative adversarial networks (GANs), variational autoencoders (VAEs), multimodal models, and/or other generative AI models as understood by one of ordinary skill in the relevant art(s) having benefit of this disclosure).

Embodiments described herein have been described with respect to language models such as LLMs. A language model is a model that estimates the probability of a token or sequence of tokens occurring in a longer sequence of tokens. In this context, a "token" is an atomic unit that the model is training on and making predictions on. A token may be a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image).

A large language model (LLM) is a language model that has a high number of model parameters. For instance, an LLM may have millions, billions, trillions, or even greater numbers of model parameters. Model parameters of an LLM are the weights and biases the model learns during training. An LLM is (pre-)trained using self-supervised learning and/or semi-supervised learning.

Figure 13:
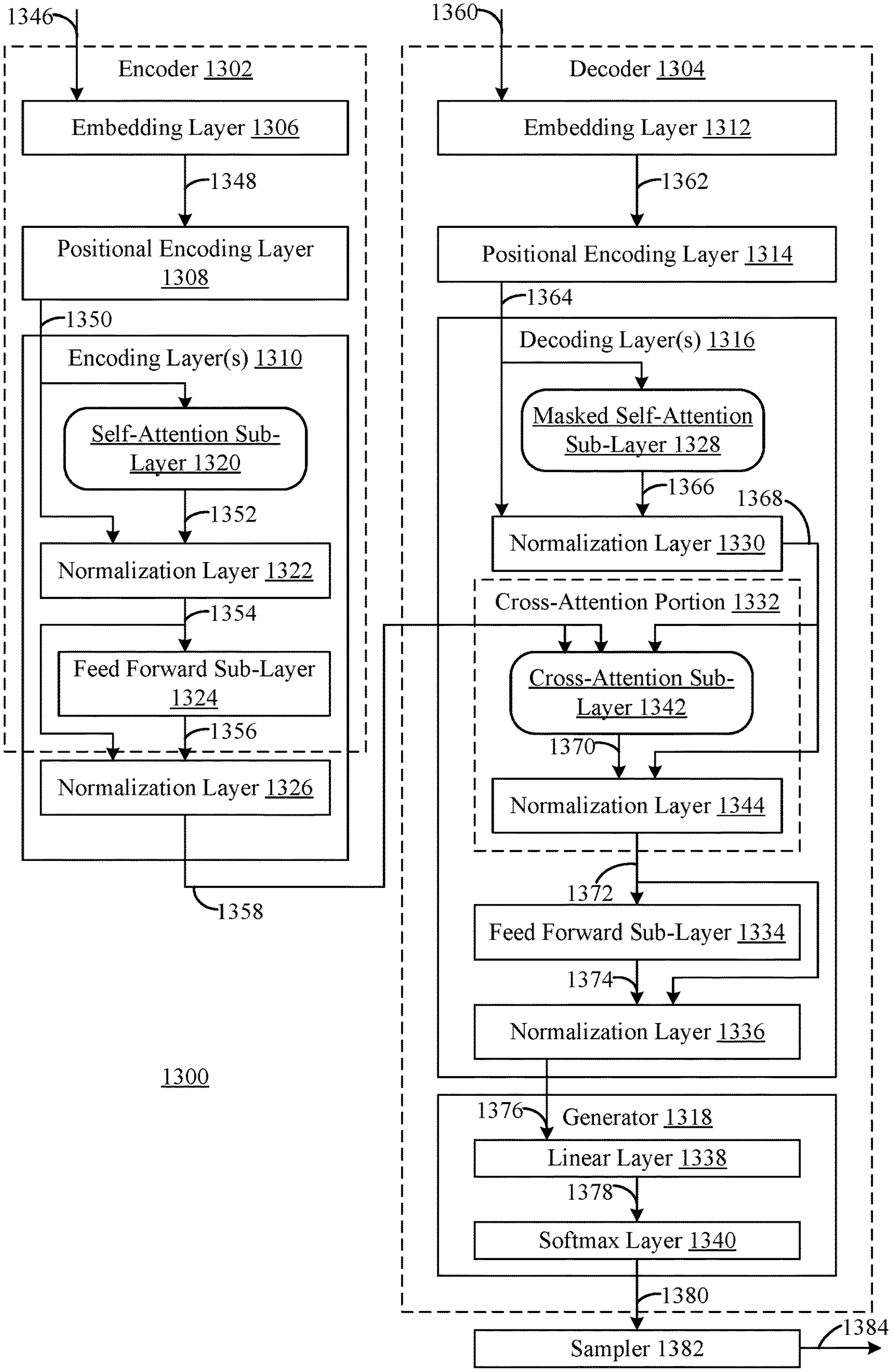
FIG. 13 shows a block diagram of a transformer-based large language model, in accordance with an example embodiment.

Some implementations of LLMs are transformer-based LLMs (e.g., the family of generative pre-trained transformer (GPT) models, Pathways Language model (PaLM), Large Language Model Meta AI (LLaMMA), BigScience Large Open-science Open-access Multilingual Language Model (BLOOM), and/or the like). A transformer is a neural network architecture that relies on self-attention mechanisms to transform a sequence of input embeddings into a sequence of output embeddings (e.g., without relying on convolutions or recurrent neural networks). Examples of transformer-based LLMs utilized by embodiments described herein may be implemented as described with respect to FIG. 13. FIG. 13 shows a block diagram of a transformer-based LLM 1300 ("LLM 1300" herein), in accordance with an example embodiment. LLM 1300 is an example of generative AI model 104 as described with respect to FIGS. 1, 2, 7, and 11, as well as elsewhere herein, which may include each of the components described with respect to LLM 1300.

Depending on the implementation, transformer-based LLMs may comprise an encoder and/or a decoder. For instance, as shown in FIG. 13, LLM 1300 comprises an encoder 1302 and a decoder 1304. Encoder 1302 transforms a sequence of embeddings into a new sequence of the same length. Encoder 1302 comprises an embedding layer 1306, a positional encoding layer 1308 and a plurality of encoding layers 1310 ("encoding layers 1310"). Each encoding layer of an encoder comprises two sub-layers, an attention sub-layer and a feed-forward sub-layer. For instance, as shown in FIG. 13, each of encoding layers 1310 comprises a self-attention sublayer 1320 and a feed forward sub-layer 1324. Each of encoding layers 1310 also include normalization layers 1322 and 1326. In some implementations, each of encoding layers 1310 are identical in configuration. The operations of encoder 1302 and its subcomponents are described as follows.

Embedding layer 1306 receives input 1346 and outputs input embeddings 1348. Input 1346 is a sequence of tokens and embedding layer 1306 utilizes learned embeddings to convert input 1346 to a vector of dimension $d_{model}$. In accordance with an embodiment, the learned embeddings include a weight matrix multiplied by the square root of the model's dimension ($d_{model}$).

Positional encoding layer 1308 receives input embeddings 1348 and outputs encoded input embeddings 1350. Encoded input embeddings 1350 are in a vector form (also referred to as an "input vector"). In accordance with an embodiment, LLM 1300 does not include recurrence or convolution. In this context, positional encoding layer 1308 is utilized to inject relative and/or absolute position of tokens in input embeddings 1348. The positional embeddings are summed with input embeddings 1348 to generate encoded input embeddings 1350. Positional encodings may be learned, fixed, or another type of positional encoding as understood by a person ordinarily skilled in the relevant art having benefit of this disclosure.

Encoded input embeddings 1350 output by positional encoding layer 1308 either flow to self-attention sub-layer 1320 or "skip" self-attention sub-layer 1320 via a residual connection to normalization layer 1322. In implementations, residual connections improve convergence of training results of LLM 1300 by allowing data to "skip" through some of the layers (or sub-layers) of encoder 1302 and/or decoder 1304.

Self-attention sub-layer 1320 applies an attention function to received encoded input embeddings 1350 (e.g., the portion of encoded input embeddings 1350 that did not skip self-attention sub-layer 1320) to generate attended output 1352. Self-attention sub-layer computes attended output 1352 as a weighted sum of values, where the weight assigned to each value is computed as a compatibility function of the query with the corresponding key. In accordance with an embodiment, the value, the query, and the key are vectors of an input vector (e.g., of encoded input embeddings 1350) projected through trained weights (e.g., a value weight, a query weight, and a key weight). Example attention functions include, but are not limited to, additive attention, dot-product attention, and scaled dot-product attention. In embodiments, self-attention sub-layer 1320 attends to previous and subsequent embeddings for a particular value when computing output 1352.

In accordance with an embodiment, self-attention sub-layer 1320 utilizes multi-head attention, wherein multiple attention sub-layers run in parallel and respective outputs of the multiple attention sub-layers are concatenated to generate attended output 1352. In a further embodiment of multi-head attention, each of the parallel attention sub-layers utilizes different learned linear projections to a dimension of the values, queries, and keys. Since the dimension of each parallel attention sub-layer is reduced, the total computational cost of multi-head attention is similar to that of single-head attention with full dimensionality.

Normalization layer 1322 receives residual encoded input embeddings 1350 and attended output 1352 and generates normalized output 1354. Normalized output 1354 is a function of LayerNorm1($x$+Sublayer1($y$)), where "x" is the residual encoded input embeddings 1350 (e.g., embeddings that skip self-attention sub-layer 1320), "y" is the encoded input embeddings 1350 received by self-attention sub-layer 1320, Sublayer1( ) is a function implemented by self-attention sub-layer 1320 (e.g., an attention function and (e.g., optionally) any other concatenation, linearization, or other post-processing implemented by self-attention sub-layer 1320), and Sublayer1(*y*) is the output of self-attention sub-layer 1320 (i.e., attended output 1352). Similar to encoded input embeddings 1350, normalized output 1354 output by normalization layer 1322 may flow to feed forward sub-layer 1324 or "skip" feed forward sub-layer 1324 via a residual connection to normalization layer 1326.

Feed forward sub-layer 1324 receives (e.g., a portion of) normalized output 1354 and generates forward output 1356. In accordance with an embodiment, feed forward sub-layer 1324 is a position-wise fully connected feed-forward network. In a further embodiment, feed forward sub-layer 1324 is implemented using two linear layers with a Rectified Linear Unit (ReLU) activation function in between.

Normalization layer 1326 operates similar to normalization layer 1322, in that normalization layer 1326 receives residual normalized output 1354 and forward output 1356 and generates encoder output 1358. Encoder output 1358 is a function of LayerNorm(x+Sublayer2(*y*)), where "x" is the portion of residual normalized output 1354 (e.g., normalized output that skips feed forward sub-layer 1324), "y" is the portion of residual normalized output 1354 received by feed forward sub-layer 1324, Sublayer2( ) is a function implemented by feed forward sub-layer 1324, and Sublayer2(*y*) is the output of feed forward sub-layer 1324 (i.e., forward output 1356).

Decoder 1304 transforms a sequence of embeddings into a new sequence, possibly with a different length. Decoder 1304 comprises an embedding layer 1312, a positional encoding layer 1314, a plurality of decoding layers 1316 ("decoding layers 1316"), and a generator 1318. Each decoding layer of a decoder comprises a number of sub-layers. For instance, as shown in FIG. 13, each of decoding layers 1316 comprises a masked self-attention sub-layer 1328, a cross-attention portion 1332 comprising a cross-attention sub-layer 1342, and a feed forward sub-layer 1334. As also shown in FIG. 13, each of decoding layers 1316 also include normalization layers 1330 and 1336, and each cross-attention portion 1332 of each decoding layers 1316 comprises a normalization layer 1344. Normalization layers 1330, 1336, and 1344 may operate in a manner similar to normalization layers 1322 and 1326. Fedd forward sub-layer 1334 may operate in a manner similar to feed forward sub-layer 1324. In some implementations, each of decoding layers 1316 are identical in configuration. The operations of decoder 1304 and its sub-components are described as follows.

Embedding layer 1312 receives input 1360 and outputs output embeddings 1362. Input 1360 is a sequence of tokens and embedding layer 1312 utilizes learned embeddings to convert input 1360 to a vector of dimension $d_{model}$ to generate output embeddings 1362. In accordance with an embodiment, the learned embeddings utilized by embedding layer 1312 are the same as the embeddings used by embedding layer 1306.

Positional encoding layer 1314 receives output embeddings 1362 and outputs encoded output embeddings 1364. Encoded output embeddings 1364 are in a vector form. In accordance with an embodiment, LLM 1300 does not include recurrence or convolution. In this context, positional encoding layer 1314 is utilized to inject relative and/or absolute position of tokens in output embeddings 1362. The positional embeddings are summed with output embeddings 1362 to generate encoded output embeddings 1364. Positional encodings may be learned, fixed, or another type of positional encoding as understood by a person ordinarily skilled in the relevant art having benefit of this disclosure. Similar to encoded input embeddings 1350 described above, encoded output embeddings 1362 may flow to masked self-attention sub-layer 1328 or "skip" masked self-attention sub-layer 1328 via a residual connection to normalization layer 1330.

Masked self-attention sub-layer 1328 receives (e.g., a portion of) encoded output embeddings 1362 and generates masked attended output 1366. Masked self-attention sub-layer 1328 operates in a similar manner to self-attention sub-layer 1320 with the following difference: masked self-attention sub-layer 1328 is configured to (e.g., only) attend to embeddings that are prior to the token being predicted. Furthermore, output embeddings 1364 are offset by one position. In this manner, predictions made by decoder 1304 depend (e.g., only) on known outputs at positions prior to the predicted output. Masked self-attention sub-layer 1328 may utilize attention functions and/or multi-head attention techniques similar to those described with respect to self-attention sub-layer 1320.

Normalization layer 1330 receives residual encoded output embeddings 1364 and masked attended output 1366 and generates normalized output 1368. Normalized output 1368 is a function of LayerNorm3(*x*+Sublayer3(*y*)), where "x" is the residual encoded output embeddings 1364 (e.g., embeddings that skip masked self-attention sub-layer 1328), "y" is the encoded output embeddings 1364 received by masked self-attention sub-layer 1328, Sublayer3( ) is a function implemented by masked self-attention sub-layer 1328 (e.g., an attention function and (e.g., optionally) any other concatenation, linearization, or other post-processing implemented by masked self-attention sub-layer 1328), and Sublayer3(*y*) is the output of masked self-attention sub-layer 1328 (i.e., masked attended output 1366). Normalized output 1368 may flow to cross-attention sub-layer 1342 or "skip" cross-attention sub-layer 1342 via a residual connection to normalization layer 1344.

Cross-attention sub-layer 1342 receives encoder output 1358 and (e.g., a portion of) normalized output 1368 and generates cross-attended output 1370. Cross-attention sub-layer 1342 operates in a manner similar to self-attention sub-layer 1320 with the following differences. The query vector of cross-attention sub-layer 1342 is the vector of normalized output 1368 projected through a trained query weight for cross-attention sub-layer 1342. The value and key vectors of cross-attention sub-layer 1342 are the vector of encoder output 1358 projected through respective trained value and key weights for cross-attention sub-layer 1342. In this context, cross-attention sub-layer 1342 utilizes an attention function to compute cross-attended output 1370 as a sum of values (which are from the encoder) weighted by the outcome of a function of the query (which is from the decoder) and the key (which is from the encoder). In other words, computation of cross-attended output 1370 depends on the encoder (which evaluates tokens at all positions) and decoder (which evaluates tokens at positions before a predicted outcome). Cross-attention sub-layer 1342 may utilize any of the attention functions and/or multi-head attention as described with respect to self-attention sub-layer 1342 to generate cross-attended output 1370.

Normalization layer 1344 receives residual normalized output 1368 and cross-attended output 1370 and generates normalized output 1372. Normalized output 1372 is a function of LayerNorm4($x$+Sublayer4($y$)), where "x" is the residual normalized output 1368 (e.g., embeddings that skip cross-attention sub-layer 1342), "y" is the normalized output 1368 received by cross-attention sub-layer 1342, Sublayer4( ) is a function implemented by cross-attention sub-layer 1342 (e.g., an attention function and (e.g., optionally) any other concatenation, linearization, or other post-processing implemented by cross-attention sub-layer 1342), and Sublayer4($y$) is the output of cross-attention sub-layer 1342 (i.e., cross-attended output 1370). Normalized output 1372 may flow to feed forward sub-layer 1334 or "skip" feed forward sub-layer 1334 via a residual connection to normalization layer 1336.

Feed forward sub-layer 1334 receives (e.g., a portion of) normalized output 1372 and generates forward output 1374. In accordance with an embodiment, feed forward sub-layer is configured in a similar manner as feed forward sub-layer 1324 to generate forward output 1374.

Normalization layer 1336 receives residual normalized output 1372 and forward output 1374 and generates normalized output 1376. Normalized output 1376 is a function of LayerNorm(x+Sublayer5($y$)), where "x" is the portion of residual normalized output 1372 (e.g., normalized output that skips feed forward sub-layer 1334), "y" is the portion of residual normalized output 1372 received by feed forward sub-layer 1336, Sublayer5( ) is a function implemented by feed forward sub-layer 1334, and Sublayer5($y$) is the output of feed forward sub-layer 1334 (i.e., forward output 1374).

Generator 1318 receives normalized output 1376 and generates output probabilities. As shown in FIG. 13, generator 1318 comprises a linear layer 1338 and a softmax layer 1340. Linear layer 1338 receives normalized output 1376 and generates a transformed output 1378. Linear layer 1338 performs a learned linear transformation on normalized output 1376 to generate transformed output 1378. In accordance with an embodiment, linear layer 1338 utilizes the same weight matrix as embedding layer 1306 and/or embedding layer 1312. Transformed output 1378 comprises predictions for tokens for each sub-sequence of a sequence (including the next token in a sequence).

Softmax layer 1340 receives transformed output 1378 and generates output probabilities 1380. Softmax layer 1340 converts values in transformed output 1378 into a probability distribution to generate output probabilities 1380. In accordance with an embodiment, output probabilities 1380 is a vector of probabilities of a particular token being chosen.

Sampler 1382 receives output probabilities 1380 and infers from output probabilities 1380 the next token in a sequence. For example, as shown in FIG. 13, sampler 1382 selects a token 1384 based on output probabilities 1380.

In some embodiments, an LLM is a "decoder only" LLM. In this context, the LLM does not include an encoder or a cross-attention portion. In a "decoder only" implementation, an LLM may include a subset of decoder 1304. For instance, in a non-limiting example of such an LLM, the LLM comprises positional encoding layer 1310, a plurality of reduced decoding layers, and generator 1314. In this example, each of reduced decoding layers comprises masked multi-headed attention sub-layers 1324, normalization layer 1326, feed forward sub-layer 1330, and normalization layer 1332. Since there is no encoder layer in this implementation, cross-attention portion 1328 is omitted. In this context, feedforward sub-layer 1330 and normalization layer 1332 receive output 1360 (i.e., instead of output 1364).

LLM 1300 has been described with respect to multiple feed forward sub-layers and normalization layers. In accordance with an embodiment each of feed forward sub-layers 1324 and 1334 are identical in configuration. Alternatively, feed forward sub-layer 1324 varies in configuration from feed forward sub-layer 1334. In accordance with another embodiment, two or more of normalization layer 1322, normalization layer 1326, normalization layer 1330, normalization layer 1336, and/or normalization layer 1344 are identical configuration. Alternatively, each of the normalization layers vary in configuration from one another.

VI. Example Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
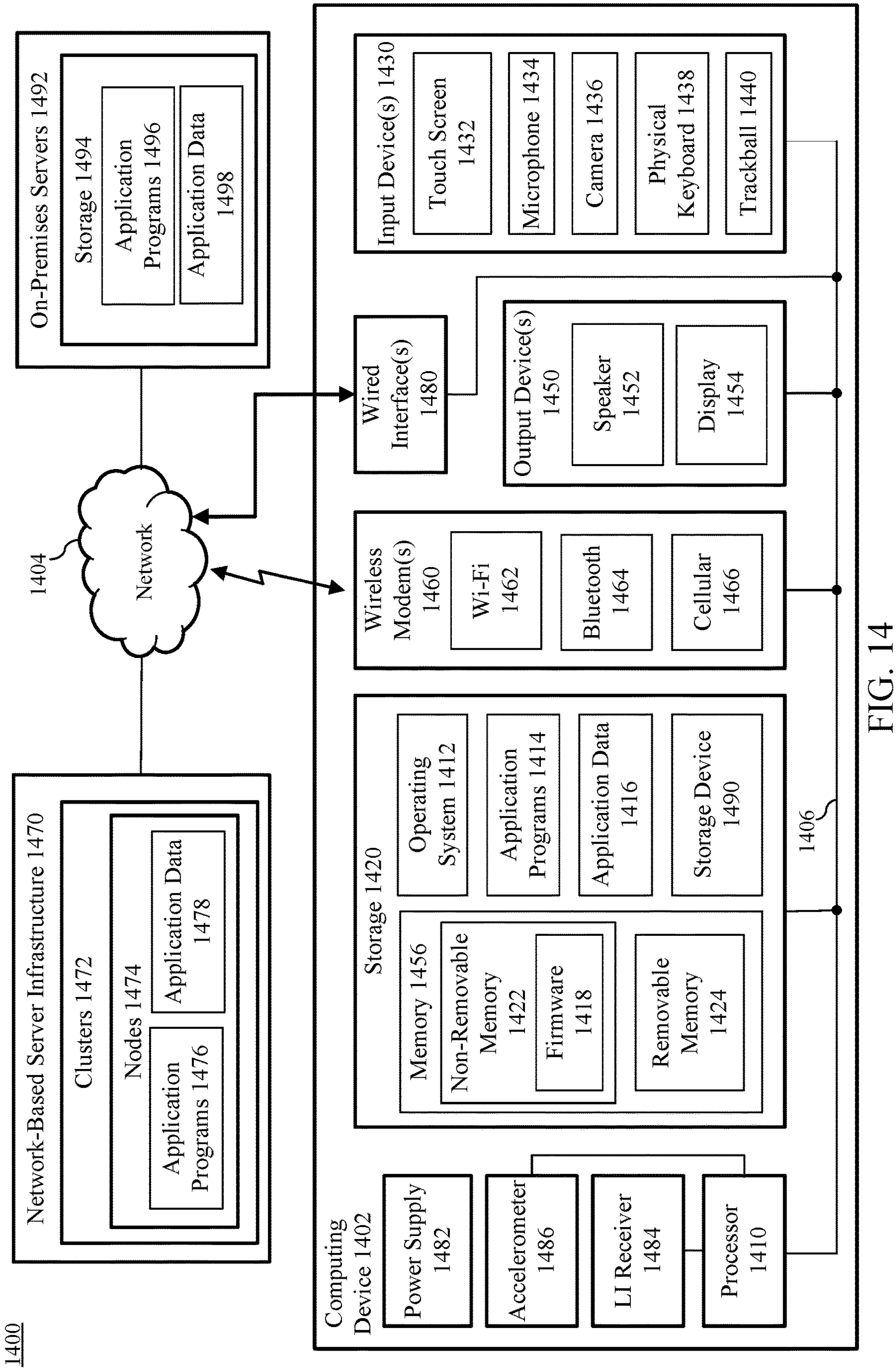
FIG. 14 shows a block diagram of an example computing environment in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 14. FIG. 14 shows a block diagram of an exemplary computing environment 1400 that includes a computing device 1402. Computing device 1402 is an example of computing device 102, model server 120, SDGT server 122, and emulator server 124 in FIG. 1, which may each include one or more of the components of computing device 1402. In some embodiments, computing device 1402 is communicatively coupled with devices (not shown in FIG. 14) external to computing environment 1400 via network 1404. Network 1404 comprises one or more networks such as local area networks (LANs), wide area networks (WANs), enterprise networks, the Internet, etc., and may include one or more wired and/or wireless portions. Network 1404 may additionally or alternatively include a cellular network for cellular communications. Computing device 1402 is described in detail as follows.

Computing device 1402 can be any of a variety of types of computing devices. For example, computing device 1402 may be a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. Computing device 1402 may alternatively be a stationary computing device such as a desktop computer, a personal computer (PC), a stationary server device, a minicomputer, a mainframe, a supercomputer, etc.

As shown in FIG. 14, computing device 1402 includes a variety of hardware and software components, including a processor 1410, a storage 1420, one or more input devices 1430, one or more output devices 1450, one or more wireless modems 1460, one or more wired interfaces 1480, a power supply 1482, a location information (LI) receiver 1484, and an accelerometer 1486. Storage 1420 includes memory 1456, which includes non-removable memory 1422 and removable memory 1424, and a storage device 1490. Storage 1420 also stores an operating system 1412, application programs 1414, and application data 1416. Wireless modem(s) 1460 include a Wi-Fi modem 1462, a Bluetooth modem 1464, and a cellular modem 1466. Output device(s) 1450 includes a speaker 1452 and a display 1454. Input device(s) 1430 includes a touch screen 1432, a microphone 1434, a camera 1436, a physical keyboard 1438, and a trackball 1440. Not all components of computing device 1402 shown in FIG. 14 are present in all embodiments, additional components not shown may be present, and any combination of the components may be present in a particular embodiment. These components of computing device 1402 are described as follows.

A single processor 1410 (e.g., central processing unit (CPU), microcontroller, a microprocessor, signal processor, ASIC (application specific integrated circuit), and/or other physical hardware processor circuit) or multiple processors 1410 may be present in computing device 1402 for performing such tasks as program execution, signal coding, data processing, input/output processing, power control, and/or other functions. Processor 1410 may be a single-core or multi-core processor, and each processor core may be single-threaded or multithreaded (to provide multiple threads of execution concurrently). Processor 1410 is configured to execute program code stored in a computer readable medium, such as program code of operating system 1412 and application programs 1414 stored in storage 1420. The program code is structured to cause processor 1410 to perform operations, including the processes/methods disclosed herein. Operating system 1412 controls the allocation and usage of the components of computing device 1402 and provides support for one or more application programs 1414 (also referred to as "applications" or "apps"). Application programs 1414 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. Processor(s) 1410 may include one or more general processors (e.g., CPUs) configured with or coupled to one or more hardware accelerators, such as one or more NPUs and/or one or more GPUs.

Any component in computing device 1402 can communicate with any other component according to function, although not all connections are shown for ease of illustration. For instance, as shown in FIG. 14, bus 1406 is a multiple signal line communication medium (e.g., conductive traces in silicon, metal traces along a motherboard, wires, etc.) that may be present to communicatively couple processor 1410 to various other components of computing device 1402, although in other embodiments, an alternative bus, further buses, and/or one or more individual signal lines may be present to communicatively couple components. Bus 1406 represents one or more of any of several types of bus structures, including a memory bus or memory controller, a peripheral bus, an accelerated graphics port, and a processor or local bus using any of a variety of bus architectures.

Storage 1420 is physical storage that includes one or both of memory 1456 and storage device 1490, which store operating system 1412, application programs 1414, and application data 1416 according to any distribution. Non-removable memory 1422 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1422 may include main memory and may be separate from or fabricated in a same integrated circuit as processor 1410. As shown in FIG. 14, non-removable memory 1422 stores firmware 1418, which may be present to provide low-level control of hardware. Examples of firmware 1418 include BIOS (Basic Input/Output System, such as on personal computers) and boot firmware (e.g., on smart phones). Removable memory 1424 may be inserted into a receptacle of or otherwise coupled to computing device 1402 and can be removed by a user from computing device 1402. Removable memory 1424 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1490 may be present that are internal and/or external to a housing of computing device 1402 and may or may not be removable. Examples of storage device 1490 include a hard disk drive, a SSD, a thumb drive (e.g., a USB (Universal Serial Bus) flash drive), or other physical storage device.

One or more programs may be stored in storage 1420. Such programs include operating system 1412, one or more application programs 1414, and other program modules and program data. Examples of such application programs may include, for example, computer program logic (e.g., computer program code/instructions) for implementing generative AI model 104, SDGT 106, workload emulator 108, application 110, synthetic data generator 112, prompter 114, data handler 116, argument provider 220, synthetic data handler 222, model trainer 738, lightweight model 740, schema analyzer 1104, and/or prompt generator 1106, as well as any of flowcharts or interaction diagrams 300A, 300B, 400, 500, and/or any individual steps thereof, as well as any of code fragments 500A, 500B, 500C, 500D, 500E, 500F, 500G, 600A, 600B, 600C, 600D, 900A, 900B, 900C, and/or 900D, and/or any individual code statements and/or blocks thereof.

Storage 1420 also stores data used and/or generated by operating system 1412 and application programs 1414 as application data 1416. Examples of application data 1416 include web pages, text, images, tables, sound files, video data, and other data, which may also be sent to and/or received from one or more network servers or other devices via one or more wired or wireless networks. Storage 1420 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1402 through one or more input devices 1430 and may receive information from computing device 1402 through one or more output devices 1450. Input device(s) 1430 may include one or more of touch screen 1432, microphone 1434, camera 1436, physical keyboard 1438 and/or trackball 1440 and output device(s) 1450 may include one or more of speaker 652 and display 1454. Each of input device(s) 1430 and output device(s) 1450 may be integral to computing device 1402 (e.g., built into a housing of computing device 1402) or external to computing device 1402 (e.g., communicatively coupled wired or wirelessly to computing device 1402 via wired interface(s) 1480 and/or wireless modem(s) 1460). Further input devices 1430 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1454 may display information, as well as operating as touch screen 1432 by receiving user commands and/or other information (e.g., by touch, finger gestures, virtual keyboard, etc.) as a user interface. Any number of each type of input device(s) 1430 and output device(s) 1450 may be present, including multiple microphones 1434, multiple cameras 1436, multiple speakers 1452, and/or multiple displays 1454.

One or more wireless modems 1460 can be coupled to antenna(s) (not shown) of computing device 1402 and can support two-way communications between processor 1410 and devices external to computing device 1402 through network 1404, as would be understood to persons skilled in the relevant art(s). Wireless modem 1460 is shown generically and can include a cellular modem 1466 for communicating with one or more cellular networks, such as a GSM network for data and voice communications within a single cellular network, between cellular networks, or between the mobile device and a public switched telephone network (PSTN). Wireless modem 1460 may also or alternatively include other radio-based modem types, such as a Bluetooth modem 1464 (also referred to as a "Bluetooth device") and/or Wi-Fi modem 1462 (also referred to as an "wireless adaptor"). Wi-Fi modem 1462 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1464 is configured to communicate with another Bluetooth-capable device according to the Bluetooth short-range wireless technology standard(s) such as IEEE 802.15.1 and/or managed by the Bluetooth Special Interest Group (SIG).

Computing device 1402 can further include power supply 1482, LI receiver 684, accelerometer 1486, and/or one or more wired interfaces 1480. Example wired interfaces 1480 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1480 of computing device 1402 provide for wired connections between computing device 1402 and network 1404, or between computing device 1402 and one or more devices/peripherals when such devices/peripherals are external to computing device 1402 (e.g., a pointing device, display 1454, speaker 1452, camera 1436, physical keyboard 1438, etc.). Power supply 1482 is configured to supply power to each of the components of computing device 1402 and may receive power from a battery internal to computing device 1402, and/or from a power cord plugged into a power port of computing device 1402 (e.g., a USB port, an A/C power port). LI receiver 1484 may be used for location determination of computing device 1402 and may include a satellite navigation receiver such as a Global Positioning System (GPS) receiver or may include other type of location determiner configured to determine location of computing device 1402 based on received information (e.g., using cell tower triangulation, etc.). Accelerometer 1486 may be present to determine an orientation of computing device 1402.

Note that the illustrated components of computing device 1402 are not required or all-inclusive, and fewer or greater numbers of components may be present as would be recognized by one skilled in the art. For example, computing device 1402 may also include one or more of a gyroscope, barometer, proximity sensor, ambient light sensor, digital compass, etc. Processor 1410 and memory 1456 may be co-located in a same semiconductor device package, such as being included together in an integrated circuit chip, FPGA, or system-on-chip (SOC), optionally along with further components of computing device 1402.

In embodiments, computing device 1402 is configured to implement any of the above-described features of flowcharts herein. Computer program logic for performing any of the operations, steps, and/or functions described herein may be stored in storage 1420 and executed by processor 1410.

In some embodiments, server infrastructure 1470 may be present in computing environment 1400 and may be communicatively coupled with computing device 1402 via network 1404. Server infrastructure 1470, when present, may be a network-accessible server set (e.g., a cloud-based environment or platform). As shown in FIG. 14, server infrastructure 1470 includes clusters 1472. Each of clusters 1472 may comprise a group of one or more compute nodes and/or a group of one or more storage nodes. For example, as shown in FIG. 14, cluster 1472 includes nodes 1474. Each of nodes 1474 are accessible via network 1404 (e.g., in a "cloud-based" embodiment) to build, deploy, and manage applications and services. Any of nodes 1474 may be a storage node that comprises a plurality of physical storage disks, SSDs, and/or other physical storage devices that are accessible via network 1404 and are configured to store data associated with the applications and services managed by nodes 1474. For example, as shown in FIG. 14, nodes 1474 may store application data 1478.

Each of nodes 1474 may, as a compute node, comprise one or more server computers, server systems, and/or computing devices. For instance, a node 1474 may include one or more of the components of computing device 1402 disclosed herein. Each of nodes 1474 may be configured to execute one or more software applications (or "applications") and/or services and/or manage hardware resources (e.g., processors, memory, etc.), which may be utilized by users (e.g., customers) of the network-accessible server set. For example, as shown in FIG. 14, nodes 1474 may operate application programs 1476. In an implementation, a node of nodes 1474 may operate or comprise one or more virtual machines, with each virtual machine emulating a system architecture (e.g., an operating system), in an isolated manner, upon which applications such as application programs 1476 may be executed.

In an embodiment, one or more of clusters 1472 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1472 may be a datacenter in a distributed collection of datacenters. In embodiments, exemplary computing environment 1400 comprises part of a cloud-based platform.

In an embodiment, computing device 1402 may access application programs 1476 for execution in any manner, such as by a client application and/or a browser at computing device 1402.

For purposes of network (e.g., cloud) backup and data security, computing device 1402 may additionally and/or alternatively synchronize copies of application programs 1414 and/or application data 1416 to be stored at network-based server infrastructure 1470 as application programs 1476 and/or application data 1478. For instance, operating system 1412 and/or application programs 1414 may include a file hosting service client configured to synchronize applications and/or data stored in storage 1420 at network-based server infrastructure 1470.

In some embodiments, on-premises servers 1492 may be present in computing environment 1400 and may be communicatively coupled with computing device 1402 via network 1404. On-premises servers 1492, when present, are hosted within an organization's infrastructure and, in many cases, physically onsite of a facility of that organization. On-premises servers 1492 are controlled, administered, and maintained by IT (Information Technology) personnel of the organization or an IT partner to the organization. Application data 1498 may be shared by on-premises servers 1492 between computing devices of the organization, including computing device 1402 (when part of an organization) through a local network of the organization, and/or through further networks accessible to the organization (including the Internet). Furthermore, on-premises servers 1492 may serve applications such as application programs 1496 to the computing devices of the organization, including computing device 1402. Accordingly, on-premises servers 1492 may include storage 1494 (which includes one or more physical storage devices such as storage disks and/or SSDs) for storage of application programs 1496 and application data 1498 and may include one or more processors for execution of application programs 1496. Still further, computing device 1402 may be configured to synchronize copies of application programs 1414 and/or application data 1416 for backup storage at on-premises servers 1492 as application programs 1496 and/or application data 1498.

Embodiments described herein may be implemented in one or more of computing device 1402, network-based server infrastructure 1470, and on-premises servers 1492. For example, in some embodiments, computing device 1402 may be used to implement systems, clients, or devices, or components/subcomponents thereof, disclosed elsewhere herein. In other embodiments, a combination of computing device 1402, network-based server infrastructure 1470, and/or on-premises servers 1492 may be used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1420. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1414) may be stored in storage 1420. Such computer programs may also be received via wired interface(s) 1480 and/or wireless modem(s) 1460 over network 1404. Such computer programs, when executed or loaded by an application, enable computing device 1402 to implement features of embodiments discussed herein. Accordingly, such computer programs represent controllers of the computing device 1402.

Embodiments are also directed to computer program products comprising computer code or instructions stored on any computer-readable medium or computer-readable storage medium. Such computer program products include the physical storage of storage 1420 as well as further physical storage types.

VII. Additional Exemplary Embodiments

A system for generating synthetic data for use in performance benchmarking is described herein. The system comprises a processor circuit and a memory device. The memory device stores program code to be executed by the processor circuit. The program code comprises a synthetic data generator configured to: provide a prompt comprising a domain to a large language model (LLM); receive, from the LLM, a data parameter associated with the domain that specifies a boundary for synthetic values in a column of data; provide an argument comprising the data parameter to a scalable data generation tool configured to generate data based on the data parameter; receive, from the scalable data generation tool, scaled data comprising a column of synthetic data values, each synthetic data value within the boundary specified by the data parameter; and cause an emulated workload to utilize synthetic data comprising the scaled data to generate a performance benchmark for the domain.

In a further embodiment of the foregoing system, the data parameter is a range data parameter that specifies a first range subset and a second range subset and the argument provided to the scalable data generation tool causes the scalable data generation tool to select a value within the first range subset and a value within the second range subset to generate the scaled data.

In a further embodiment of the foregoing system, the data parameter specifies a categorical list of elements and the argument provided to the scalable data generation tool causes the scalable data generation tool to select an element from the list of elements to generate the scaled data.

In a further embodiment of the foregoing system, the synthetic data comprises synthetic sentence data.

In a further embodiment of the foregoing system, the synthetic data generator is further configured to: responsive to the prompt provided to the LLM, receive training data generated by the LLM based on the prompt; train a lightweight model to generate synthetic sentences based on the received training data; receive, from the lightweight model, the synthetic sentence data; and append the synthetic sentence data to the scaled data to generate the synthetic data.

In a further embodiment of the foregoing system, the synthetic data generator is further configured to: receive a schema file comprising metadata associated with the domain; and generate the prompt based on the schema file.

In a further embodiment of the foregoing system, the scalable data generation tool is a non-artificial-intelligence scalable data generation tool.

A method for generating synthetic data is described herein. The method comprises: providing a prompt comprising a domain to a large language model (LLM); receiving, from the LLM, a data parameter associated with the domain that specifies a boundary for synthetic values in a column of data; providing an argument comprising the data parameter to a scalable data generation tool configured to generate data based on the data parameter; receiving, from the scalable data generation tool, scaled data comprising a column of synthetic data values, each synthetic data value within the boundary specified by the data parameter; and causing an emulated workload to utilize synthetic data comprising the scaled data to generate a performance benchmark for the domain.

In a further embodiment of the foregoing method, the data parameter is a range data parameter that specifies a first range subset and a second range subset and said providing the argument to the scalable data generation tool causes the scalable data generation tool to select a value within the first range subset and a value within the second range subset to generate the scaled data.

In a further embodiment of the foregoing method, the data parameter comprises a categorical list of elements and said providing the argument to the scalable data generation tool causes the scalable data generation tool to select an element from the list of elements to generate the scaled data.

In a further embodiment of the foregoing method, the synthetic data comprises synthetic sentence data.

In a further embodiment of the foregoing method, the method further comprises: responsive to said providing the prompt to the LLM, receiving training data generated by the LLM based on the prompt; training a lightweight model to generate synthetic sentences based on the received training data; receiving, from the lightweight model, the synthetic sentence data; and appending the synthetic sentence data to the scaled data to generate the synthetic data.

In a further embodiment of the foregoing method, the method further comprises: receiving a schema file comprising metadata associated with the domain; and generating the prompt based on the schema file.

In a further embodiment of the foregoing method, the scalable data generation tool is a non-artificial-intelligence scalable data generation tool.

A computer-readable storage medium encoded with program instructions that, when executed by a processor circuit, perform a method is described herein. The method comprises: providing a prompt comprising a domain to a large language model (LLM); receiving, from the LLM, a data parameter associated with the domain that specifies a boundary for synthetic values in a column of data; providing an argument comprising the data parameter to a scalable data generation tool configured to generate data based on the data parameter; receiving, from the scalable data generation tool, scaled data comprising a column of synthetic values, each synthetic data value within the boundary specified by the data parameter; and causing an emulated workload to utilize synthetic data comprising the scaled data to generate a performance benchmark for the domain.

In a further embodiment of the foregoing computer-readable storage medium, the data parameter is a range data parameter that specifies a first range subset and a second range subset and said providing the argument to the scalable data generation tool causes the scalable data generation tool to select a value within the first range subset and a value within the second range subset to generate the scaled data.

In a further embodiment of the foregoing computer-readable storage medium, the data parameter comprises a categorical list of elements and said providing the argument to the scalable data generation tool causes the scalable data generation tool to select an element from the list of elements to generate the scaled data.

In a further embodiment of the foregoing computer-readable storage medium, the synthetic data comprises synthetic sentence data.

In a further embodiment of the foregoing computer-readable storage medium, the method further comprises: responsive to said providing the prompt to the LLM, receiving training data generated by the LLM based on the prompt; training a lightweight model to generate synthetic sentences based on the received training data; receiving, from the lightweight model, the synthetic sentence data; and appending the synthetic sentence data to the scaled data to generate the synthetic data.

In a further embodiment of the foregoing computer-readable storage medium, the method further comprises: receiving a schema file comprising metadata associated with the domain; and generating the prompt based on the schema file.

In a further embodiment of the foregoing computer-readable storage medium, the scalable data generation tool is a non-artificial-intelligence scalable data generation tool.

VIII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Further still, example embodiments have been described with respect to LLMs; however, it is also contemplated herein that embodiments may utilize other types of generative AI models (e.g., a generative adversarial network (GAN), a variational autoencoder (VAE), a multimodal model, and/or the like). For instance, an implementation of the described systems and/or methods may leverage a multimodal model that inputs and/or outputs more than one modality. For example, an alternative embodiment utilizes a multimodal generative AI model that generates text and images from a prompt. As a non-limiting example, in a healthcare domain scenario, the multimodal generative AI model may generate images representing X-rays, CT scans, MRIs, or other images related to the healthcare domain.

Moreover, according to the described embodiments and techniques, any components of systems, computing devices, servers, applications, synthetic data generators, generative AI models, SDGTs, workload emulators, lightweight models, storages, and/or their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system for generating synthetic data for use in performance benchmarking, comprising:
- a processor circuit; and
- a memory device that stores program code to be executed by the processor circuit, the program code comprising:
  - a synthetic data generator configured to:
    - provide a prompt comprising a domain to a large language model (LLM);
    - receive, from the LLM, a data parameter associated with the domain that specifies a boundary for synthetic values in a column of data;
    - provide an argument comprising the data parameter to a scalable data generation tool configured to generate data based on the data parameter;
    - receive, from the scalable data generation tool, scaled data comprising a column of synthetic data values, each synthetic data value within the boundary specified by the data parameter; and
    - cause an emulated workload to utilize synthetic data comprising the scaled data to generate a performance benchmark for the domain.

2. The system of claim 1, wherein the data parameter is a range data parameter that specifies a first range subset and a second range subset; and
- wherein the argument provided to the scalable data generation tool causes the scalable data generation tool to select a value within the first range subset and a value within the second range subset to generate the scaled data.

3. The system of claim 1, wherein the data parameter specifies a categorical list of elements; and
- wherein the argument provided to the scalable data generation tool causes the scalable data generation tool to select an element from the list of elements to generate the scaled data.

4. The system of claim 1, wherein the synthetic data comprises synthetic sentence data.

5. The system of claim 4, wherein the synthetic data generator is further configured to:
- responsive to the prompt provided to the LLM, receive training data generated by the LLM based on the prompt;
- train a lightweight model to generate synthetic sentences based on the received training data;
- receive, from the lightweight model, the synthetic sentence data; and
- append the synthetic sentence data to the scaled data to generate the synthetic data.

6. The system of claim 1, wherein the synthetic data generator is further configured to:
- receive a schema file comprising metadata associated with the domain; and
- generate the prompt based on the schema file.

7. The system of claim 1, wherein the scalable data generation tool is a non-artificial-intelligence scalable data generation tool.

8. A method for generating synthetic data comprising:
- providing a prompt comprising a domain to a large language model (LLM);

receiving, from the LLM, a data parameter associated with the domain that specifies a boundary for synthetic values in a column of data;

providing an argument comprising the data parameter to a scalable data generation tool configured to generate data based on the data parameter;

receiving, from the scalable data generation tool, scaled data comprising a column of synthetic data values, each synthetic data value within the boundary specified by the data parameter; and causing an emulated workload to utilize synthetic data comprising the scaled data to generate a performance benchmark for the domain.

9. The method of claim 8, wherein the data parameter is a range data parameter that specifies a first range subset and a second range subset; and wherein said providing the argument to the scalable data generation tool causes the scalable data generation tool to select a value within the first range subset and a value within the second range subset to generate the scaled data.

10. The method of claim 8, wherein the data parameter comprises a categorical list of elements;

wherein said providing the argument to the scalable data generation tool causes the scalable data generation tool to select an element from the list of elements to generate the scaled data.

11. The method of claim 8, wherein the synthetic data comprises synthetic sentence data.

12. The method of claim 11, further comprising:

responsive to said providing the prompt to the LLM, receiving training data generated by the LLM based on the prompt;

training a lightweight model to generate synthetic sentences based on the received training data;

receiving, from the lightweight model, the synthetic sentence data; and appending the synthetic sentence data to the scaled data to generate the synthetic data.

13. The method of claim 8, further comprising:

receiving a schema file comprising metadata associated with the domain; and generating the prompt based on the schema file.

14. The method of claim 8, wherein the scalable data generation tool is a non-artificial-intelligence scalable data generation tool.

15. A non-transitory computer-readable storage medium encoded with program instructions that, when executed by a processor circuit, perform a method comprising:

providing a prompt comprising a domain to a large language model (LLM);

receiving, from the LLM, a data parameter associated with the domain that specifies a boundary for synthetic values in a column of data;

providing an argument comprising the data parameter to a scalable data generation tool configured to generate data based on the data parameter;

receiving, from the scalable data generation tool, scaled data comprising a column of synthetic values, each synthetic data value within the boundary specified by the data parameter; and causing an emulated workload to utilize synthetic data comprising the scaled data to generate a performance benchmark for the domain.

16. The non-transitory computer-readable storage medium of claim 15, wherein the data parameter is a range data parameter that specifies a first range subset and a second range subset; and wherein said providing the argument to the scalable data generation tool causes the scalable data generation tool to select a value within the first range subset and a value within the second range subset to generate the scaled data.

17. The non-transitory computer-readable storage medium of claim 15, wherein the data parameter comprises a categorical list of elements;

wherein said providing the argument to the scalable data generation tool causes the scalable data generation tool to select an element from the list of elements to generate the scaled data.

18. The non-transitory computer-readable storage medium of claim 15, wherein the synthetic data comprises synthetic sentence data.

19. The non-transitory computer-readable storage medium of claim 18, wherein the method further comprises:

responsive to said providing the prompt to the LLM, receiving training data generated by the LLM based on the prompt;

training a lightweight model to generate synthetic sentences based on the received training data;

receiving, from the lightweight model, the synthetic sentence data; and appending the synthetic sentence data to the scaled data to generate the synthetic data.

20. The non-transitory computer-readable storage medium of claim 15, wherein the method further comprises:

receiving a schema file comprising metadata associated with the domain; and generating the prompt based on the schema file.

* * * * *